(12) United States Patent
Wang et al.

(10) Patent No.: US 10,438,228 B2
(45) Date of Patent: Oct. 8, 2019

(54) SYSTEMS AND METHODS FOR PRICE MATCHING AND COMPARISON

(71) Applicant: Wal-Mart Stores, Inc., Bentonville, AR (US)

(72) Inventors: Joseph Y. Wang, San Bruno, CA (US); Venkata Syam Prakash Rapaka, Mountain View, CA (US); Vivek Parekh, Fremont, CA (US); Paul Kay Hatch, Bentonville, AR (US); Melisa Rodriguez, Rogers, AR (US); Ronald G. Benson, San Francisco, CA (US); Srirama M. Bolla, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 14/292,633

(22) Filed: May 30, 2014

(65) Prior Publication Data
US 2014/0304059 A1    Oct. 9, 2014

Related U.S. Application Data

(63) Continuation-in-part of application No. 13/754,620, filed on Jan. 30, 2013, now abandoned.

(51) Int. Cl.
*G06Q 30/00* (2012.01)
*G06Q 30/02* (2012.01)

(52) U.S. Cl.
CPC ..... *G06Q 30/0234* (2013.01); *G06Q 30/0225* (2013.01)

(58) Field of Classification Search
CPC .................................................. G06Q 30/0225
(Continued)

(56) References Cited

U.S. PATENT DOCUMENTS

| 5,226,519 A | 7/1993 | Dewoolfson |
| 5,642,279 A | 6/1997 | Bloomberg et al. |

(Continued)

FOREIGN PATENT DOCUMENTS

| WO | 1996001454 | 1/1996 |
| WO | 1997046985 | 12/1997 |

(Continued)

OTHER PUBLICATIONS

Microsoft Computer Dictionary, Fifth Edition, 2002, Microsoft Press, p. 23.*

(Continued)

*Primary Examiner* — Matthew T Sittner
*Assistant Examiner* — Michael I Ezewoko
(74) *Attorney, Agent, or Firm* — Bryan Cave Leighton Paisner LLP

(57) ABSTRACT

A method and system for providing a consumer comparative pricing data from at least two merchants is discussed. In one aspect of the invention a customer queries a database containing time and location specific pricing data for competitors of a first merchant. If the query shows that the customer could have purchased the same item or items for a lower price at a competitor, the first merchant awards the customer an on-line credit that is redeemable at the merchant. In another aspect, a consumer uploads an image of a competitor's receipt. The item specific data on the receipt is converted to UPC codes on an item-by-item basis. These UPC codes are then compared against the merchant's pricing database and the consumer is provided data set comparing the prices the consumer paid to the prices the consumer would have paid had the consumer shopped at the merchant.

13 Claims, 22 Drawing Sheets

(58) Field of Classification Search
USPC .................................................... 705/14.26
See application file for complete search history.

(56) References Cited

U.S. PATENT DOCUMENTS

| | | |
|---|---|---|
| 5,873,069 A | 2/1999 | Reuhl |
| 5,883,968 A | 3/1999 | Welch |
| 6,016,480 A | 1/2000 | Houvener |
| 6,076,070 A | 6/2000 | Stack |
| 6,732,081 B2 | 5/2004 | Nicholson |
| 6,811,030 B1 | 11/2004 | Compton |
| 6,912,507 B1 | 6/2005 | Phillips et al. |
| 7,069,240 B2 | 6/2006 | Spero et al. |
| 7,082,415 B1 | 7/2006 | Robinson et al. |
| 7,099,833 B1 | 8/2006 | Sundaresan |
| 7,107,225 B1 | 9/2006 | McClung, III |
| 7,198,192 B2 | 4/2007 | Page et al. |
| 7,200,576 B2 | 4/2007 | Steeves et al. |
| 7,455,226 B1 | 11/2008 | Hammond |
| 7,580,860 B2 | 8/2009 | Junger |
| 7,580,873 B1 | 8/2009 | Silver et al. |
| 7,606,731 B2 | 10/2009 | McClung, III |
| 7,657,470 B1 | 2/2010 | Delurgio et al. |
| 7,660,738 B1 | 2/2010 | Siegel et al. |
| 7,740,172 B1 | 6/2010 | Hubert |
| 7,746,510 B2 | 6/2010 | Pandipati |
| 7,783,515 B1 | 8/2010 | Kumar et al. |
| 7,792,709 B1 | 9/2010 | Trandal et al. |
| 7,865,427 B2 | 1/2011 | Wright et al. |
| 7,881,991 B2 | 2/2011 | Darrell |
| 8,006,900 B2 | 8/2011 | Grigsby |
| 8,027,439 B2 | 9/2011 | Zoldi et al. |
| 8,046,260 B2 | 10/2011 | Haddad et al. |
| 8,108,287 B2 | 1/2012 | Kirch et al. |
| 8,160,984 B2 | 4/2012 | Hunt et al. |
| 8,175,918 B2 | 5/2012 | Cooper et al. |
| 8,180,682 B2 | 5/2012 | Narayanaswami et al. |
| 8,249,916 B2* | 8/2012 | Gworek ................ G06Q 30/02 705/1.1 |
| 8,346,634 B2 | 1/2013 | Shiftan |
| 8,356,750 B2 | 1/2013 | Hammond |
| 8,448,859 B2 | 5/2013 | Goncalves |
| 8,458,010 B1 | 6/2013 | Geoffrin et al. |
| 8,494,909 B2 | 7/2013 | Goncalves |
| 8,511,574 B1* | 8/2013 | Yen ...................... G06K 19/07 235/493 |
| 8,615,422 B1 | 12/2013 | Alkasimi |
| 8,793,760 B2 | 7/2014 | Raper |
| 10,032,185 B2 | 7/2018 | Watfa et al. |
| 2002/0052756 A1 | 5/2002 | Lomangino |
| 2002/0069118 A1 | 6/2002 | Zylstra |
| 2002/0198772 A1 | 12/2002 | Bates et al. |
| 2004/0088230 A1 | 5/2004 | Elliott |
| 2005/0160014 A1 | 7/2005 | Moss |
| 2005/0240525 A1* | 10/2005 | Bagayatkar .......... G06Q 20/102 705/40 |
| 2005/0240535 A1* | 10/2005 | Grooms ................ G06Q 20/12 705/72 |
| 2005/0246225 A1 | 11/2005 | Jorgensen |
| 2006/0015403 A1 | 1/2006 | McClung, III |
| 2006/0261160 A1 | 11/2006 | Garner |
| 2007/0021973 A1 | 1/2007 | Stremier |
| 2007/0073592 A1 | 3/2007 | Perry et al. |
| 2007/0094087 A1 | 4/2007 | Mitchell |
| 2007/0174073 A1 | 7/2007 | Hunscher |
| 2007/0265914 A1 | 11/2007 | McClung |
| 2008/0005017 A1 | 1/2008 | Poster |
| 2008/0073429 A1 | 3/2008 | Oesterling |
| 2008/0086411 A1 | 4/2008 | Olson |
| 2008/0140576 A1 | 6/2008 | Lewis et al. |
| 2008/0149725 A1 | 6/2008 | Rosenbaum |
| 2008/0201226 A1* | 8/2008 | Carlson ............... G06Q 20/387 705/14.26 |
| 2008/0255951 A1 | 10/2008 | Miller et al. |
| 2009/0018965 A1 | 1/2009 | Neydavood |
| 2009/0048934 A1 | 2/2009 | Haddad |
| 2009/0138358 A1 | 5/2009 | Gonen |
| 2009/0271265 A1 | 10/2009 | Lay |
| 2009/0299887 A1 | 12/2009 | Shiran et al. |
| 2009/0327062 A1* | 12/2009 | Botes ..................... 705/14.17 |
| 2010/0042488 A1 | 2/2010 | McClung, III |
| 2010/0306080 A1 | 12/2010 | Trandal et al. |
| 2011/0066483 A1 | 3/2011 | Salmon et al. |
| 2011/0225098 A1 | 9/2011 | Wolff |
| 2011/0307318 A1 | 12/2011 | LaPorte et al. |
| 2012/0018501 A1 | 1/2012 | Wilen |
| 2012/0078682 A1 | 3/2012 | Pinsley et al. |
| 2012/0078739 A1 | 3/2012 | Maraz |
| 2012/0095853 A1 | 4/2012 | von Bose et al. |
| 2012/0143722 A1 | 6/2012 | John |
| 2012/0221430 A1 | 8/2012 | Naghmouchi |
| 2012/0271759 A1 | 10/2012 | Lee |
| 2012/0323663 A1 | 12/2012 | Leach |
| 2013/0030898 A1 | 1/2013 | Burton |
| 2013/0054433 A1 | 2/2013 | Giard et al. |
| 2013/0066698 A1* | 3/2013 | Levy et al. .............. 705/14.17 |
| 2013/0246143 A1 | 9/2013 | Hunt |
| 2013/0317896 A1* | 11/2013 | Liberty ................... 705/14.23 |
| 2014/0032061 A1 | 1/2014 | Wulf et al. |
| 2014/0058938 A1 | 2/2014 | McClung, III |
| 2014/0074665 A1 | 3/2014 | Stewart |
| 2014/0095350 A1 | 4/2014 | Carr et al. |
| 2014/0097237 A1 | 4/2014 | Delfer |
| 2014/0108272 A1 | 4/2014 | Mayo |
| 2014/0122325 A1 | 5/2014 | Zoldi et al. |
| 2014/0172697 A1 | 6/2014 | Ward et al. |
| 2014/0201037 A1 | 7/2014 | Mallawarachchi et al. |
| 2016/0148300 A1 | 5/2016 | Carr et al. |
| 2017/0193542 A1 | 7/2017 | Rapaka et al. |

FOREIGN PATENT DOCUMENTS

| | | |
|---|---|---|
| WO | 1999064979 | 12/1999 |
| WO | 2012131401 | 10/2012 |
| WO | WO2013159152 A1 | 10/2013 |

OTHER PUBLICATIONS

Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*
Language and Mind, Chomsky, Oxford University Press, 2005, p. 62.*
Computing the Mind, Shimon Edelman, Oxford University Press, 2008, pp. 26-31.*
Noetics, Lawrence Krader, 2010, Peter Lang Publishing, pp. 551-553.*
Britannica Concise Encyclopedia, Encyclopedia Britannica, 2006, p. 537.*
Final Office Action (U.S. Appl. No. 14/292,701; O/R 068571.00218); dated May 4, 2016.
Final Office Action (U.S. Appl. No. 14/292,629; O/R 068571.00220); dated May 2, 2016.
Final Office Action (U.S. Appl. No. 14/292,681); dated Feb. 12, 2016.
Non-Final Office Action dated Nov. 3, 2016 for U.S. Appl. No. 14/292,701.
Non-Final Office Action dated Nov. 17, 2016 for U.S. Appl. No. 14/292,681.
Non-Final Office Action dated Nov. 17, 2016 for U.S. Appl. No. 14/292,629.
Non-Final Office Action dated Dec. 1, 2016 for U.S. Appl. No. 14/292,451.
Data Warehousing, Academic Press, 2001, chapter(s) 7-9 2001.
Algorithms + Data Structures = Programs, 1976, page(s) xii-55 1976.
HCI remixed: reflections on works that have influenced the HCI community, MIT Press, 2008, pp. 275-279 2008.

(56) References Cited

OTHER PUBLICATIONS

Why A Diagram is (Sometimes) Worth Ten Thousand Words, Larkin, Simon, Congnitive Science, 1987, pp. 65-100 1987.
Streetlights and Shadows, MIT Press, 2009, pp. 33-47 2009.
The future of the internet—and how to stop it, Yale University Press, 2008, Chapter(s) 1-9, [emphasis pp. 11-18] 2008.
Database Management System, Himalaya Publishing House, 2008, chapter(s) 2-3; prior art used in this Office Action 2008.
Advanced Artificial Intelligence, Shi, World Scientific, 2011, pp. 430-458 2011.
Data Mining, Elsevier, Han and Kamber, 2006, pp. 234-274 2006.

\* cited by examiner

FIG. 1B

HARPS
*Employee Owned and Operated*

HARPS FOOD STORE

1274 Colorado Drive
Fayetteville, Ar. 72701
Phone: (479) 251-9100
or contact us @ www.harpsfood.com
Store:124

Cashier: Laura C 25

01/04/13                        12:51:38

GENERAL MERCHANDISE
CST PLS 10       474001299    9.55 T2
H*BAND-AIDS      3813700535   2.46
GROCERY
20MULE BRX 5     234000201    4.49 T2
AH B SODA 32     332000114    1.75 F1
AH B SODA 32     332000114    1.75 F1
STAIN PEN        446030597    2.79 T2
MEYER DRYR SHT L 6081241414B  7.99 T2
           SUBTOTAL          30.77
           Tax1 4.75%          .17
           Tax2 9.25%         2.52
           TOTAL             33.46
DEBIT CARDS     TENDER       33.46
Acct:XXXXXXXXXXXX7489
APPRVL CODE 573859
  CASH          CHANGE         .00

NUMBER OF ITEMS          7

-------- FSA Total $2.68 --------
Use your health spending card here.
Items beginning with H* qualify for
FSA purchase.

Trx:143   Term:3   Store:124   12:52:20

Thank you for shopping at HARPS

How's our service?
         call us at 1-868-864-2777

SYSTEMS AND METHODS FOR PRICE MATCHING AND COMPARISON

RELATED APPLICATIONS

This application is a continuation-in-part of U.S. application Ser. No. 13/754,620, filed Jan. 30, 2013. That application is incorporated herein by reference for all purposes.

BACKGROUND

Field of the Invention

This invention relates to systems and methods for managing customer profile data.

Background of the Invention

The present invention relates generally to computer software, and more particularly to a merchant based method and system for providing product price comparison and other information to a consumer. One aspect of the invention includes a merchant based price matching method and system for providing a redeemable credit to a customer if that customer could have purchased an item for a lesser price at another merchant. Another aspect of the invention is to invite the customers of competitors to use the invention to compare the prices they paid at the competitor with the prices at the merchant.

One problem frequently encountered by merchants is the inability to fully engage with customers and create "customer loyalty" through traditional advertising. Currently, many merchants attempt to gain and retain customers via advertising campaigns that highlight low prices for specific items for a given period of time: a typical "sale" price. This type of advertising campaign works well for shoppers that are interested in that particular item but have little effect on those customers that are not interested in that item.

Therefore some merchants also advertise themselves as being "the low cost leader" or "not being undersold" or "always having low prices" in an attempt to instill within a consumer's mind a positive perception that goes beyond shopping for a specific "on sale" item. This approach to advertising often has negative to mixed results as JCP Penney discovered in 2012 due to customers needing the "on sale" "hook" to bring them into a store.

Merchants need a way to combine both marketing concepts to achieve maximum return on their marketing investments. To accomplish this goal a merchant needs a tangible, interactive system and method of providing "continuing education" to existing and potential customers regarding cost savings that the customer could have obtained had he/she shopped at the merchant instead of at a competitor. It is one thing to advertise that Merchant A is the "low cost leader" but it is quite another to show a consumer, on an item-by-item basis, that the consumer could have saved "X" dollars had they bought all of their items at Merchant A instead of Merchant B.

In addition, a merchant needs an interactive system and method to prove they are the "low cost" leader and thus neutralize any "on sale" incentives offered by their competitors. One such system would incorporate a typical "ad match" guarantee but be entirely online and provide a customer a rebate in the form of a credit that can be used for subsequent purchases. Such a system would create loyalty among customers in several ways. First, the customer experiences exceptional convenience. The customer knows that there is no need to travel to another store to save money or carry sales circulars into a store as proof of a lower sales price. Second, the customer still receives the psychological benefits of participating in advertised "sales" because all "sale" prices are valid at one merchant. Third, the customer receives tangible evidence in the form of a redeemable credit proving that the merchant really "will not be undersold".

Because such a system and method will be used by the general public it must be simple to use and require minimum input and thought from shoppers, particularly those who do not enjoy shopping and do not have the time to engage in time consuming cost comparisons.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 1B is a representative retail receipt from a second merchant.

DETAILED DESCRIPTION

Figure 1A:
FIG. 1A is representative of a retail receipt from one merchant.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. In some embodiments, a customer may conduct a transaction at a POS (point of sale) device. The transaction may include the purchase of one or more items each having a purchase price paid by the customer. The transaction may be recorded in a transaction record, e.g. receipt, wherein each purchased item is represented by an item identifier. In some instances, the item identifier may be sufficient to also determine the price paid such that the transaction record need not be included in the transaction record. For example, a product database may record the price for a given item identifier at a given date and/or time. In other embodiments, the transaction record may also include the price. The transaction record may be a paper receipt printed for the customer and may also be an electronic record generated for a transaction by the POS and transmitted to a server.

A method may be executed with respect to the transaction. For example, subsequent to the first transaction, a server system may identify for each item identifier of at least a portion of the one or more item identifiers of a transaction, a third party record, the third party record corresponding to the each item identifier and having a third party price. For example, the third party record may include a competitor's advertisement or a transcription of pricing information from an advertisement by an entity that gathers pricing data.

The server system may identify one or more discounted identifiers of the one or more item identifiers, the third party price of the third party record corresponding to the discounted identifiers being less than the price paid for the one or more discounted identifiers by one or more price differences. The server system may then credit an account associated with the user identifier with an amount corresponding to the one or more price difference. The server system may then subsequently apply the amount toward a purchase price of a second transact subsequent to the first transaction.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In one broad aspect, the invention is a computer implemented system and method for matching a competitor's sales price and automatically providing a merchant's customer with a redeemable credit based on the difference in sales price. More specifically, the invention determines whether a customer who purchased an item at the merchant could have purchased the same item for a lower price elsewhere. If the customer could have purchased the identical item elsewhere at a lower price the invention provides the customer a credit for the price difference. The credit can be used during a subsequent purchase at the merchant.

Stated alternatively, the invention compares the prices listed on a customer's receipt with the prices for identical items sold at competitors. If the customer could have purchased the item at a competitor for a lesser price, the customer receives a credit for the price difference.

In preferred embodiments the redeemable credit takes the form of a credit to an online account created by the customer at the merchant. Such credits are often referred to as "e-cards" and are similar to online gift certificates known in the art.

The price matching aspect of the invention is best described in the context of a typical shopping experience. Thus, the description begins with a customer purchasing one or more items at a merchant that practices the invention. Turning now to the drawings, where like numerals refer to like parts or elements, FIG. 1A represents a typical retail receipt used in the practice of this aspect of the invention. Such receipts are presented to retail customers upon completion of a purchase. Receipts such as the one shown in FIG. 1A contain a significant amount of data regarding the purchase ("purchase data"). Purchase data typically includes the location of the purchase 10 (if the merchant has multiple locations) the date and time of the purchase 12, a list of individual items purchased 14, the price paid for each item 16, and an abbreviated identifier for each item 18, among other data.

The receipts utilized in the practice of the invention contain a transaction specific identifier, 20. The transaction specific identifier 20 (typically a numeric or alpha-numeric code) is created as part of the purchase data that is generated with each transaction and is unique to each transaction. All data generated and related to the customer's purchase is keyed to the transaction specific identifier 20 for later retrieval as discussed in more detail below.

Figure 2:
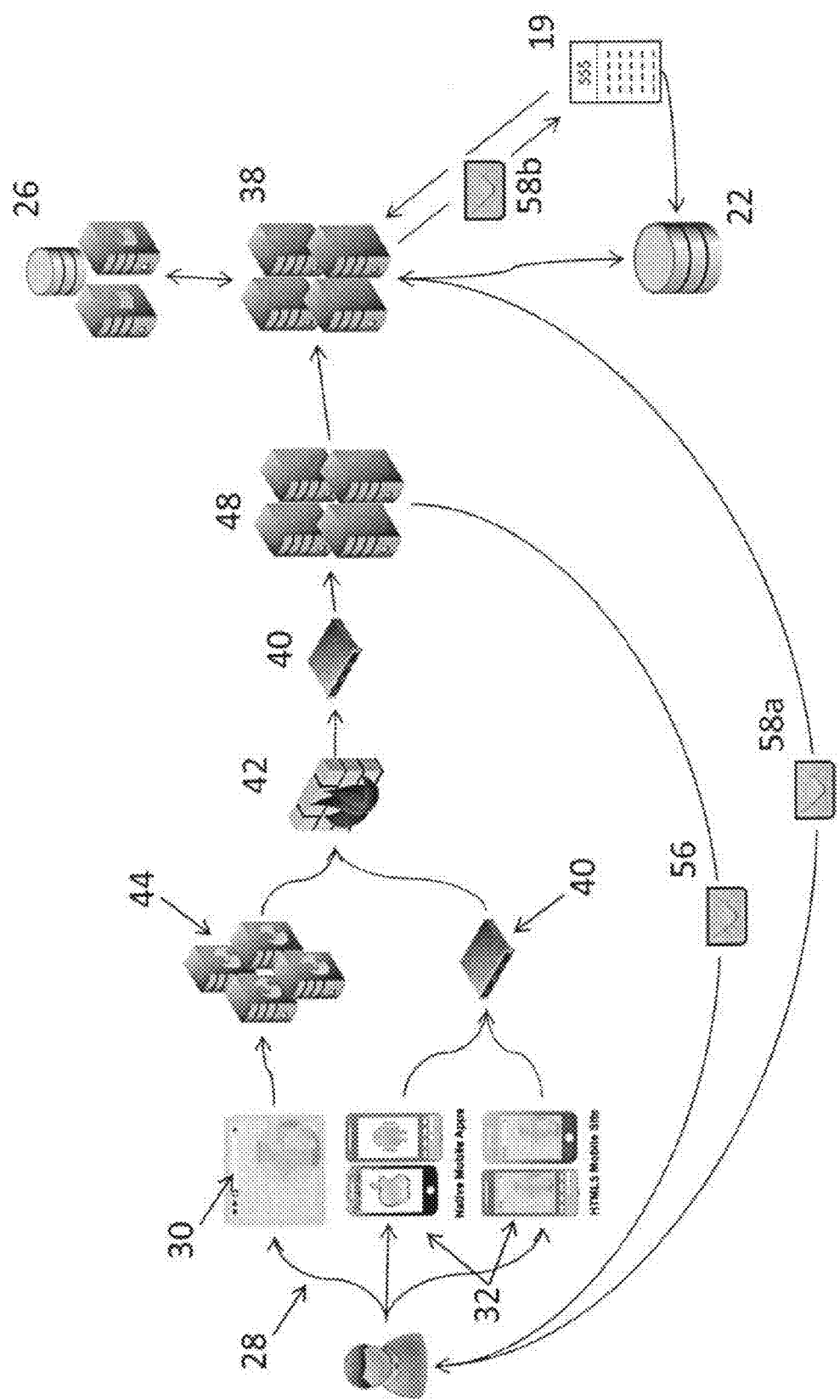
FIG. 2 is a schematic of one possible system according to the invention.

Turning now to FIG. 2, the method according to the invention includes the step of storing in a first electronic database 22 the purchase data related to a customer's purchasing transaction at the merchant 19. The stored purchase data includes data found on the receipt including the date of the transaction 12, at least one item-specific characteristic for each item (e.g., price, 16; abbreviated name, 18; etc.), and a transaction specific identifier 20. Other item-specific characteristics that can be stored (or that is retrievable from other databases) include the stock keeping unit number (SKU), a uniform product code (UPC) 24, a detailed description of the item (e.g., Mack's Earplugs 12 count), manufacturer's name, and any other data related to the item that is desired by the merchant. All of this data is stored in the first electronic database 22 in a searchable format (or is retrievable from other databases) and is keyed to the transaction specific identifier 20. The method and system also involves storing date specific pricing data for items sold by at least one competitor of the merchant in a second electronic database date 26. As with the first electronic database 22 containing the merchant's data, the second electronic database containing competitors' data is designed to permit searching, identification, and retrieval of at least one item specific characteristic for each item contained in the database.

The concept of creating a database of competitors' pricing data for comparison purposes is not new. For example, U.S. Pat. No. 7,198,192 discusses collecting a database of pricing information for a number of merchants. However, the concepts discussed in the prior art primarily rely on merchants voluntarily submitting pricing data to such a database (as in the '192 patent) or collecting the data piecemeal from individual shoppers, etc.

Neither approach works well in the real world. A merchant typically considers its entire pricing structure and data to be confidential business information and/or a trade secret. Similarly, reliance on piece-meal submissions from consumers is unworkable because there is no reliable way to conduct quality control on the submissions and there is a large potential for false or fraudulent submissions to manipulate the price matching process.

Currently, if a merchant desires accurate price comparison data for a competitor someone must manually gather that information (e.g., review sales circulars or send people to stores to gather prices) and/or supplement that data with various automated price-gathering techniques (e.g., "web crawlers", etc.). Even if the competitor raw price data collected manually or via automated techniques is accurate, that data must still be organized and cross-referenced to obtain a searchable database.

For example, UPC codes are theoretically the same across merchants and could serve as a quick way to cross-reference items at different merchants. However, someone must still match a UPC code with a competitor's price. Sometimes this process can be automated and accomplished by a computer. Sometimes it cannot. Similarly, UPC codes are not always available and are sometimes not included in sales circulars. If UPC codes are not available then non-standardized or merchant specific identifiers (e.g., SKUs or abbreviated descriptions or pictures of the item in a sales circular) are used to identify specific items and what they cost.

The availability of UPC codes still does not remove all issues regarding matching a competitor's prices to specific items. Some merchants may have a special packaging arrangement with a manufacturer that requires a distinct UPC code. Thus, a 16 oz. plastic bottle of Heinz ketchup sold at Target might have a UPC code that is different from a 16 oz. plastic bottle of Heinz ketchup sold at Walgreens although both may have the same price.

There is also a temporal component to the price comparison databases used in the practice of the invention that complicates matters. Assuming that one is able to accurately identify a competitor's non-UPC coded item or even a UPC coded item (e.g., a 16 oz. bottle of Heinz ketchup), merchants regularly offer short term "sales" for those items. This means that data points in the price comparison database must be continually monitored and updated to account for short term "sales" and regular price changes.

In short, compiling a reliable, accurate and timely database of comparative price data for a plurality of merchants is an onerous task and requires substantial resources. Very few merchants have the resources to do this. Historically, when merchants need comparative pricing data most merchants hire a third party (e.g., The Nielsen Company) to gather and organize that information. However, for ease of discussion and description it is assumed that the second electronic database 26 utilized in the practice of the invention is assembled and maintained by the merchant that utilizes the invention. If a third party database is used the system is modified to allow the merchant access to the third party database.

Figure 3:
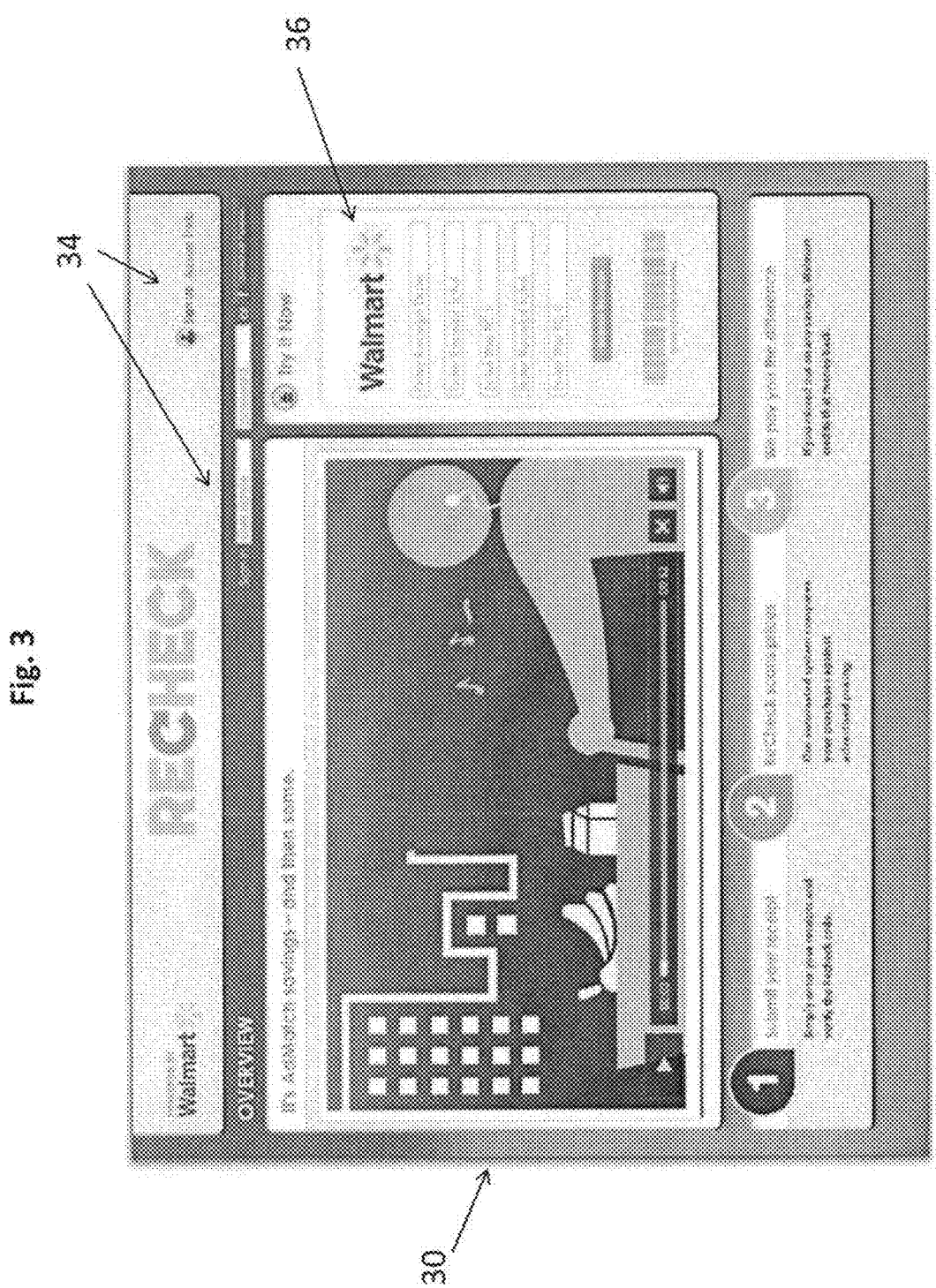
FIG. 3 illustrates a webpage that could serve as an entry portal to the method and system of the invention that provides a redeemable credit to customers.

At some point after the initial purchase, the merchant receives a request from its customer to compare the prices paid by the customer at the merchant with the advertised prices of identical items at one or more of the merchant's competitors on the date of the customer's transaction. As shown in FIG. 2, the request is generated at a system portal 28 that provides the customer access to the invention. The portal 28 can be any type of interface that provides a customer access to the system. Examples of such interfaces include a dedicated webpage 30 managed by the merchant or mobile apps 32 such as those used on iPhones and Android cell phones. Links to the system via a merchant's social media portal (e.g., Facebook) can be utilized as well. FIG. 3 is an exemplary screenshot of a webpage portal 30 that provides a customer access to the price matching aspect of the invention. Mobile apps or social media page links providing an analogous interface can be used as well.

In a preferred practice of the invention a customer obtains access to the invention through an online account with the merchant. Such online accounts for online shopping are common in the industry and need not be discussed in detail here.

Figure 4:
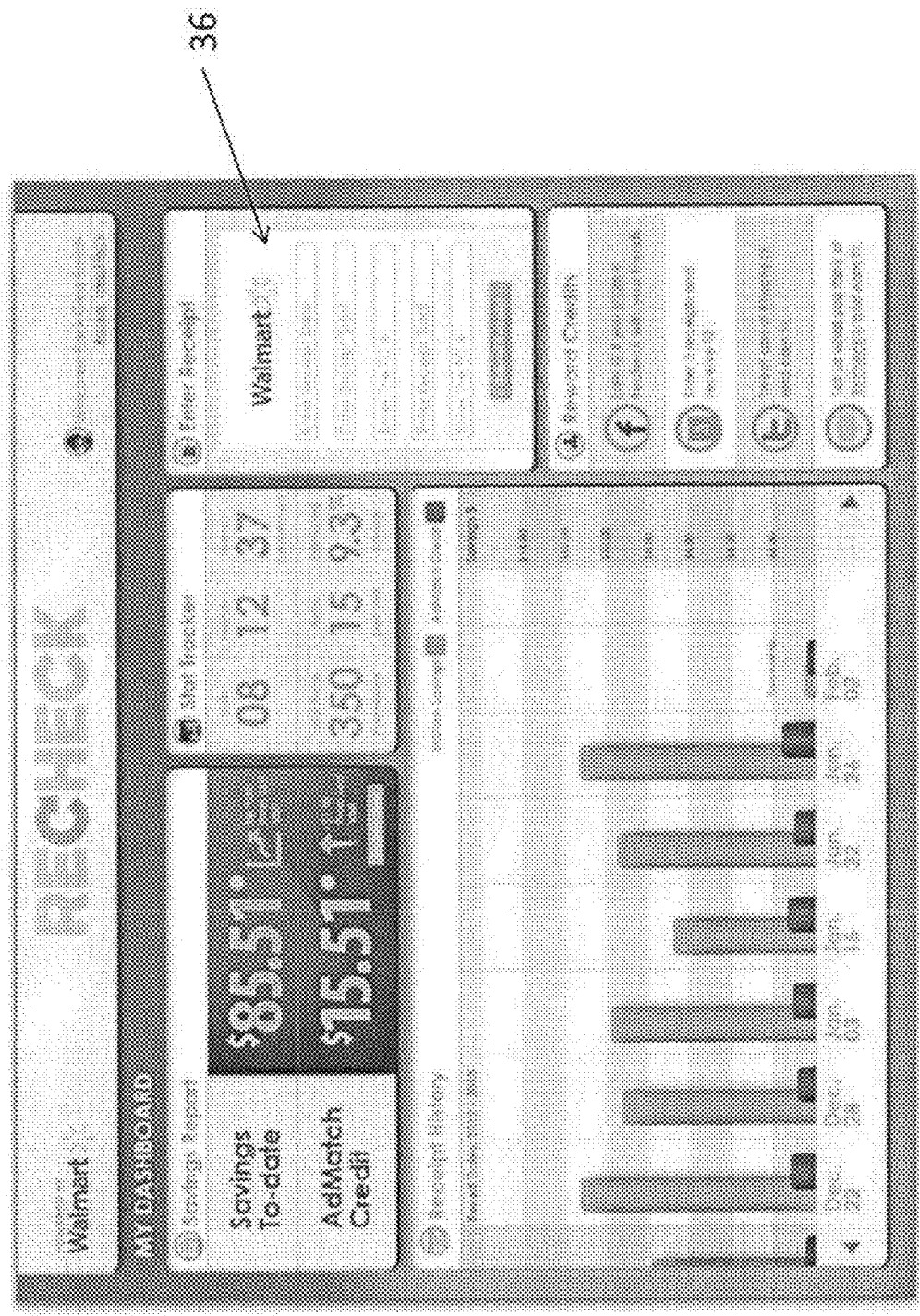
FIG. 4 illustrates a webpage that could serve as an entry portal to the method and system of the invention that provides a redeemable credit to customers.

Returning to FIG. 3 the portal 30 invites the customer to create an account or login to an existing account, 34. FIG. 4 is an example of a portal entry page 30 after an existing customer has logged into the system. Once the customer is logged into the system the invention requires certain information from the customer.

The input data required of a customer can vary depending on how a merchant's database is set up or other factors (e.g., marketing studies). For example, a portal could be arranged to require the customer to manually enter various pieces of data from the customer's receipt (e.g., location of store 10, date of purchase 12, individual UPC codes 18, and prices 16). However, requiring entry of that much data greatly diminishes customer interest and use. Generally speaking, usage of an online system is inversely proportional to the amount of data a user is required to provide.

Therefore, in one embodiment of the price matching aspect of the invention the customer only need submit the transaction specific identifier 20 to initiate the practice of the invention. One method of submitting a transaction specific identifier 20 is graphically illustrated in FIGS. 3 and 4. The transaction specific identifier 20 ("TC#") is a data point in the portal's data entry box 36. As noted previously, all of the data associated with the customer's purchase is electronically stored and keyed to the transaction specific identifier 20. Thus, providing the transaction specific identifier 20 gives the system a key to access, sort, and retrieve all of the purchase data contained in the first electronic database 22.

As with any online portal, it may be possible to automatically generate and submit fake transaction specific identifiers 20 in an attempt to fraudulently obtain redeemable credits at a merchant. Therefore, in more preferred embodiments of the invention, the system also requests information that is specific to the customer's purchase such as the receipt date 12 and/or the total cost shown on the receipt as shown in the data entry box 36 in FIGS. 3 and 4.

The customer submits the required transaction specific identifier and any additional required receipt purchase data and the resulting request for price comparison goes to a data comparison engine 38. The manner in which the electronic request reaches the data comparison engine 38 can vary with the specific architecture of the merchant's system. FIG. 2 illustrates one possible architecture in which requests from mobile apps 32 are routed through a load balancer 40 prior to passing through a firewall 42. Requests from webpage portals or social media portals are gathered in a front end website server pool 44 prior to passing through the firewall. Preferably all data is transmitted via https protocols.

In the architecture shown in FIG. 2, once the requests are received and pass through the initial firewall they are scanned by a bank of proving servers 48 to confirm that they are legitimate requests. For example, the submitted transaction specific identifiers 20 are checked against a list of known transaction specific identifiers. If there is no match (or another error is identified) a message 49 returns to the customer notifying the customer that the input data is invalid and to try again. If the submitted request passes the checks of the proving servers 48, the request is passed on to the data comparison engine 38.

The method of the invention continues by retrieving the customer's purchase data from the first database 22 and comparing the customer's data with competitor's pricing data from the second database 26. The retrieving and comparison is accomplished by the data comparison engine 38.

Alternatively, the request to compare prices can occur at the point of sale cash register 19. In this embodiment, the cash register 19 functions as the portal that accesses the system. The request to compare prices is initiated by the customer or is automatically initiated at the point of sale. As shown in FIG. 2, the purchase data generated by the point of sale cash register 19 is stored in a first electronic database 22. The data network that transfers the data to the first electronic database 22 can send the purchase data directly to the data comparison engine 38 or indirectly via the data network or indirectly via the data network that links the first database 22 with the data comparison engine 38.

The data comparison engine 38 is capable of retrieving the customer's purchase data from the first database 22, retrieving competitors' price data from the second database 26 (or receiving such data if a $3^{rd}$ party database is used), comparing the customer's data with pricing data from the second database 26, and identifying any item purchased by the customer which was offered for sale at a lower price by at least one of the merchant's competitors on the date of the customer's transaction.

The mechanics of the data comparison process can and very likely will vary from merchant to merchant and system to system based upon the hardware and software used in any particular merchant's IT system. For example, one merchant may choose to build the invention using a Microsoft based operating system. Other merchants may utilize a UNIX based operating system. Thus, the programs and commands that actually pull the data and make price comparisons are not critical to the description of the invention and are well within the skill of programmers that work in the retail area. The following price comparison discussion will focus more on the process and problems that are somewhat unique to the retail arena.

Upon receipt of the price comparison request from the customer, the data comparison engine 38 queries the first electronic database 22 to retrieve purchase data associated with the customer's purchase at the merchant. In preferred embodiments, the transaction specific identifier 20 is used to efficiently retrieve this information. The information retrieved includes at least one item specific characteristic (e.g., a UPC code) and the price of each item that the customer purchased.

Once the customer's purchase data is retrieved, the data comparison engine 38 queries the second electronic database 26 to retrieve at least one competitor's prices for the items purchased by the customer. The retrieval of the competitor's pricing data can be more difficult than the retrieval of the merchant's data.

For example, one purpose of the invention is to provide a customer with a "real time" price matching function. In other words, the price matching is preferably based on the prices offered by competitors on the date (and preferably at the time) of the customer's original purchase. Thus, the invention is unlike other price comparison/guarantee inventions such as the one discussed in U.S. Pat. No. 7,606,731 which provides a forward looking price matching function based on the merchant's own price fluctuations. (e.g., a merchant gives a customer a rebate if the merchant lowers the price on an item within a set period of time after the customer's purchase). Accordingly, and as mentioned previously, all of the gathered competitive price information in the second database 26 should be organized and searchable by date (and preferably by time).

In addition, the second electronic price database 26 should be searchable by numerous item-specific identifiers. For example, searching competitor's prices based on UPCs may provide a very efficient method for price comparison, assuming that the UPCs are truly uniform for the item at issue. As noted above, UPCs may or may not be uniform for certain products. Thus, in preferred embodiments of the invention the data contained in the second electronic database 26 is searchable and suitable for cross-reference by multiple identifiers such as product name, size, and manufacturer, among other item-specific characteristics. The process of matching items stored in both databases may include utilizing a set of criteria in which all or only a subset of the criteria need be met before finalizing the comparative data set for price matching purposes. For example, the search engine may make a first attempt at item matching by comparing merchant UPC codes with competitor UPC codes and then confirming the match based on secondary data such as item name and size. If there is no UPC match then the search engine can run a secondary search based on the item's manufacturer, name, size, SKU, etc. (e.g., Heinz, ketchup, plastic squeeze bottle, 12 oz.). If the matching criteria are met (e.g., 3 of 4 or 5 of 6 identifiers match) the item's price is pulled from the second database 26 for price matching purposes. If the search engine does not locate a match for a particular item the search can continue but the customer is notified that the invention was unable to identify a competitor's price for that item. This may be a common occurrence due to the fact that many items (e.g., a hat having the local high school football team's logo) may be sold only at one merchant or location.

In addition, the second electronic database 26 should be searchable by geographic area. Pricing for identical items can vary based upon location due to transportation costs and other factors. Thus, the method and system according to the invention should be capable of sorting the price data in the second electronic database 26 based on geographic area (e.g., within 10 miles of the original purchase). In preferred embodiments of the invention geographic limitations form part of the criteria utilized by the search engine 38 to match prices.

At the completion of the search and if the appropriate matching criteria are met, the method of the invention continues by individually identifying items purchased by the customer which were offered for sale at a lower price by at least one of the merchant's competitors on the date of the customer's transaction and within a predetermined geographical area.

The differences between the prices paid by the customer at the merchant and any lower prices offered by one of the merchant's competitors are calculated. If the price match is run against more than one competitor and more than one competitor offers an item for a lower price, the lowest of the identified prices is used to calculate the price differential. The price differentials are calculated and totaled by a price calculation engine. The price calculation engine could comprise a separate server programmed to receive the price data from the data comparison engine 38 server. Alternatively, the price calculation engine could be a subroutine executed by the data comparison engine 38 server. In FIG. 2 the price calculation engine is conducted by the hardware and software that make up the data comparison engine 38.

An optional but preferred add-on to the method according to the invention is to calculate the item-by-item savings that the customer realized by shopping at the merchant instead of at the merchant's competitors. In other words, the invention also provides the customer with item-by-item price data for items where the merchant undersold the competition. Such data can be totaled and provided to the customer as the "total savings" achieved by shopping at the merchant instead of at competitors. This function of the invention provides substantial support for marketing efforts that are centered on claims that the merchant is "the low cost leader". An example of this option is discussed below in relation to FIGS. 4 and 5.

For those items where the merchant did not offer the lowest price, the calculated total price differential for those items is sent to an award module that is capable of awarding the customer a credit that is equal to the calculated total price differential. This credit is redeemable when the customer makes a subsequent purchase at the merchant. Just as with the price calculation engine, the award module could comprise a separate server programmed to receive data from the price calculator engine and generate the credit. Alternatively, the award module could be a subroutine executed by the data comparison engine 38 server. The architecture of the merchant's on-line account system will influence how the credits are awarded to the customer and those skilled in the art are capable of designing the award module to best fit within the overall system architecture utilized by a particular merchant.

FIG. 2 illustrates one possible arrangement of the award module. In FIG. 2 the award module is conducted as a subroutine by the servers that run the data comparison engine 38. Assuming that an award is calculated and due to the customer, the award module notifies the customer via email 56, or SMS text or some other means, that the price matching process is complete and that the customer should login to his/her account. The email can contain additional information such as notification that a credit has been awarded, a direct link to the customer's online account, or other marketing material. If a credit was awarded, the credit is electronically posted to the customer's account as an "e-card" 58a or other form of redeemable credit. For embodiments where the price comparison is initiated at the point of sale 19, the customer can have the option of applying the credit at the point of sale as represented by line 58b in FIG. 2.

Figure 5:
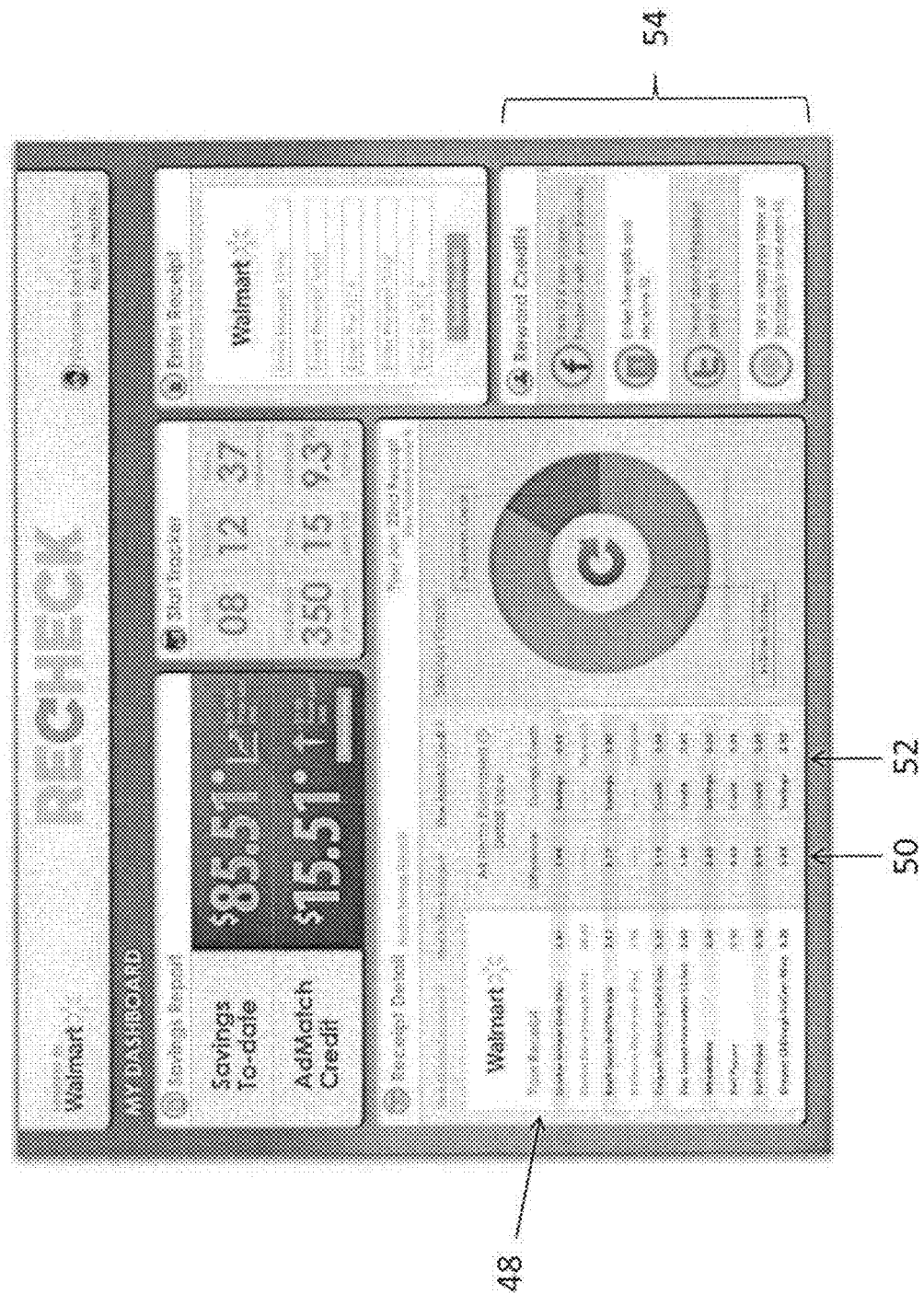
FIG. 5 illustrates a webpage showing price matching results of the method and system according to the invention.

FIGS. 3-5 illustrate an exemplary use of the invention as seen by the customer. FIG. 3 is a sample log-in page where the customer enters the required data including the transaction specific identifier 20 and initiates the request for price comparison. FIG. 4 is an alternative start page that could be viewed by a returning customer after the customer has logged into his/her online account. The start page shown in FIG. 4 provides a graphical history and running total of the "credits" accumulated by the customer. FIG. 4 also provides a "savings to date" entry which includes a running total of the price difference calculations for items where the merchant had the lower price as compared to its competitors.

FIG. 5 represents a possible webpage design for displaying the results of a particular price match request. A graphical representation of the customer's original receipt showing an item-by-item list of prices is presented and identified as element 48. Summary columns showing individual differences in price and total savings/credit are identified as elements 50 and 52, respectively. Also illustrated in FIG. 5 are optional components to the method and system such as awarding customers credits by sharing the merchant's price matching system with others via social media programs such as Facebook and Twitter, 54.

In preferred embodiments, the merchant provides additional links on the award results page that enable a customer to delve deeper into the price comparison process. For example, a "comparison details" link (not shown) could provide the customer access to a spreadsheet showing each competitor that was part of the price matching process and the prices for each item at each competitor. Any number of graphical representations can be added as well (e.g., line charts, pie charts, etc.) to enhance the price saving message that underlies the practice of the invention.

Turning now to another aspect of the invention, the invention allows a merchant to directly educate a competitor's customers regarding the merchant being "the low cost leader". In this aspect of the invention, a competitor's customer (as opposed to the merchant's customer as in the price matching aspect of the invention) submits a copy of a receipt from a competitor to a merchant's price comparison system. The merchant's system compares the prices paid by the consumer at the competitor with the prices the consumer would have paid at the merchant. The consumer then receives a data sheet showing price differences between the merchant and the competitor on an item-by-item basis.

In the following detailed description for this aspect of the invention the term "first merchant" is synonymous with the term "competitor" and the term "second merchant" is synonymous with the merchant that practices this aspect of the invention. One embodiment of this aspect of the invention is a computer-implemented system and method for providing price comparison data to a consumer. The method comprises several steps involving collecting price data, comparing price data and reporting results to the consumer via a portal similar to that used in the price matching aspect of the invention.

The price comparison method according to the invention is initiated by the consumer creating an image of a receipt from a first merchant (e.g., taking a picture with a mobile phone or scanning the receipt using a commercial scanning device) and uploading the image to the second merchant's website along with contact information from the consumer (e.g., email address) and any other information required by the practitioner of the invention (e.g., demographic data).

The system is designed to accept a plurality of image files such as jpegs and tiffs or any other image file type that is currently in use or may be developed. The images are uploaded to the system via a portal 20 such as those previously described. For purposes of the detailed description it is assumed that a consumer that utilizes the invention possesses the knowledge necessary to save an image taken by a portable device (e.g., a smartphone) and upload it to a webpage using standard software.

Figure 6:
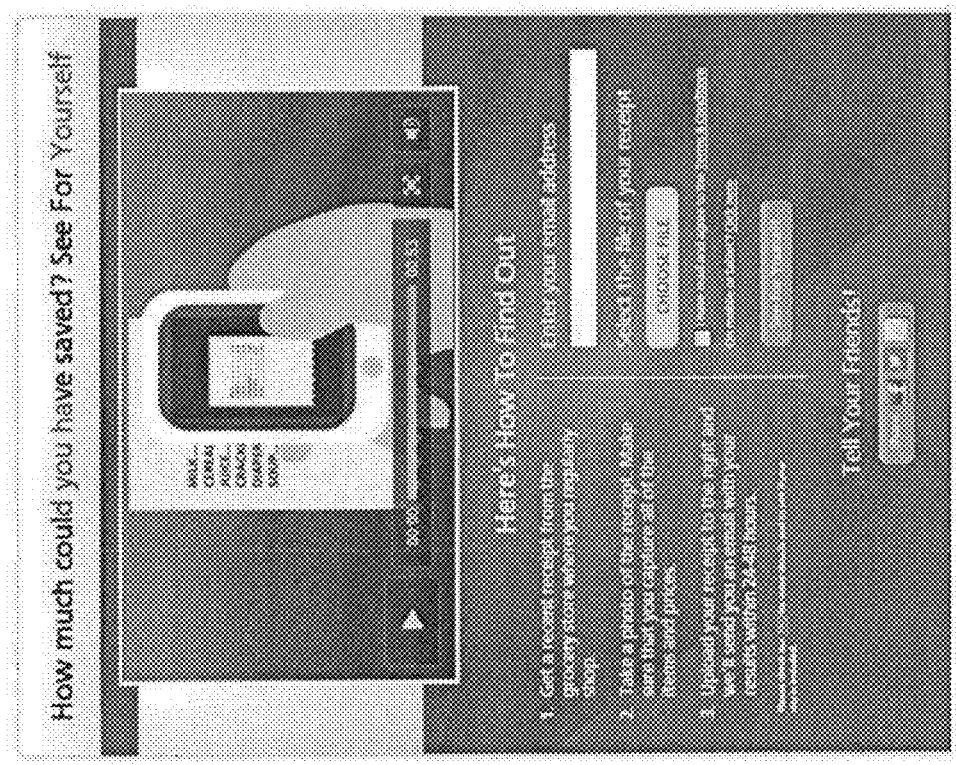
FIG. 6 illustrates a webpage entry portal for a price comparison system and method according to the invention.

FIG. 6 illustrates a webpage that could serve as an entry portal to the method and system of the invention that provides a consumer with price comparison data. Social media portals or mobile apps may also serve as points of entry to this aspect of the invention.

As noted previously, is important to remember that the information found on receipts is not standardized across the retail industry. For example, the abbreviated descriptions (elements 18 in FIG. 1) can vary from merchant to merchant. Some merchants may place an item's UPC code on the receipt while others use a SKU number. However, in the practice of the invention it is preferred that the purchase data contained on the receipt contain (1) the date of the purchase, (2) the location of the purchase, (3) a price for at least one purchased item, and (4) at least one item specific characteristic for each purchased item (e.g., Elements 16, 18, and 24 of FIGS. 1A&B discussed previously).

Figure 7:
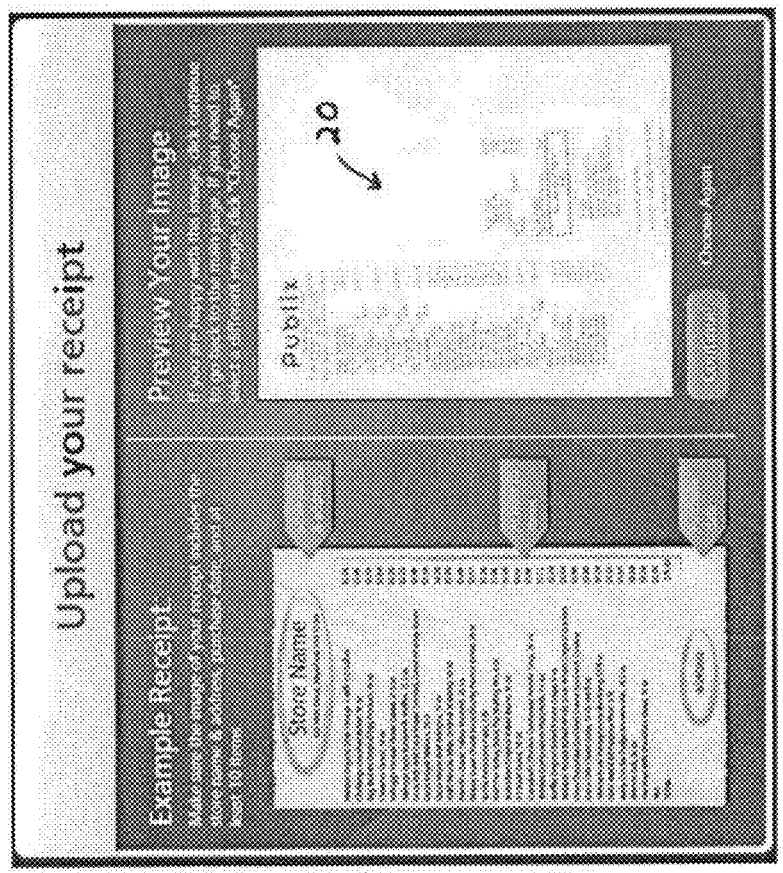
FIG. 7 illustrates a possible consumer experience as the consumer uploads a receipt to the price comparison system and method.
Figure 8:
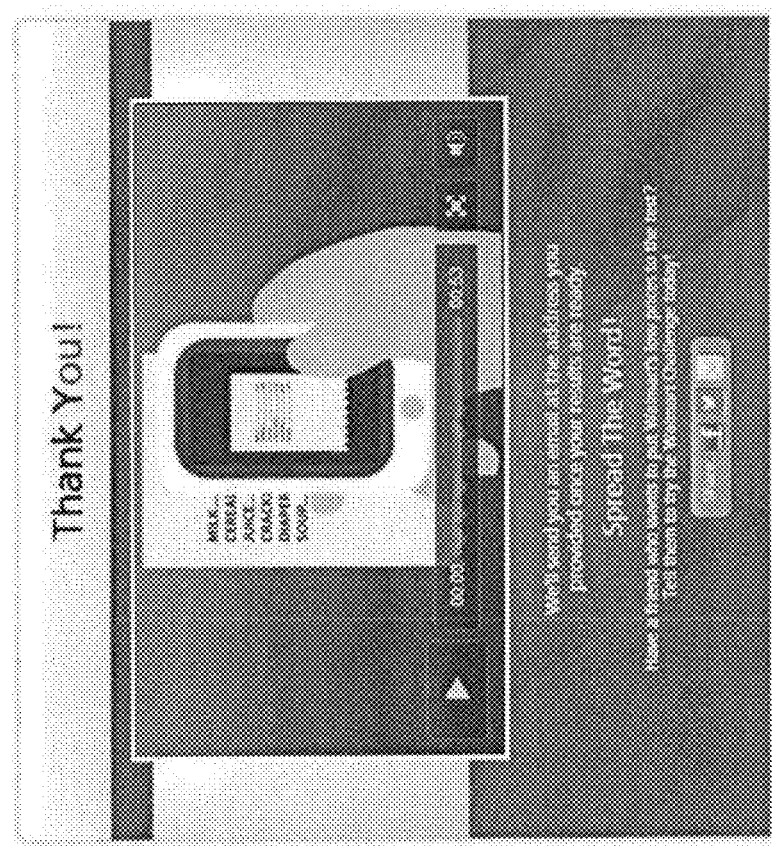
FIG. 8 illustrates a possible consumer experience after the consumer uploads a receipt to the price comparison system and method.

FIGS. 7 and 8 further illustrate how a consumer initiates this aspect of the invention. After uploading the receipt 20, the consumer is provided a preview of the image to confirm upload. FIG. 8 is a webpage thanking the consumer for using the invention and notifies them that the price comparison process is underway and that they will receive their results in due course.

Figure 9:
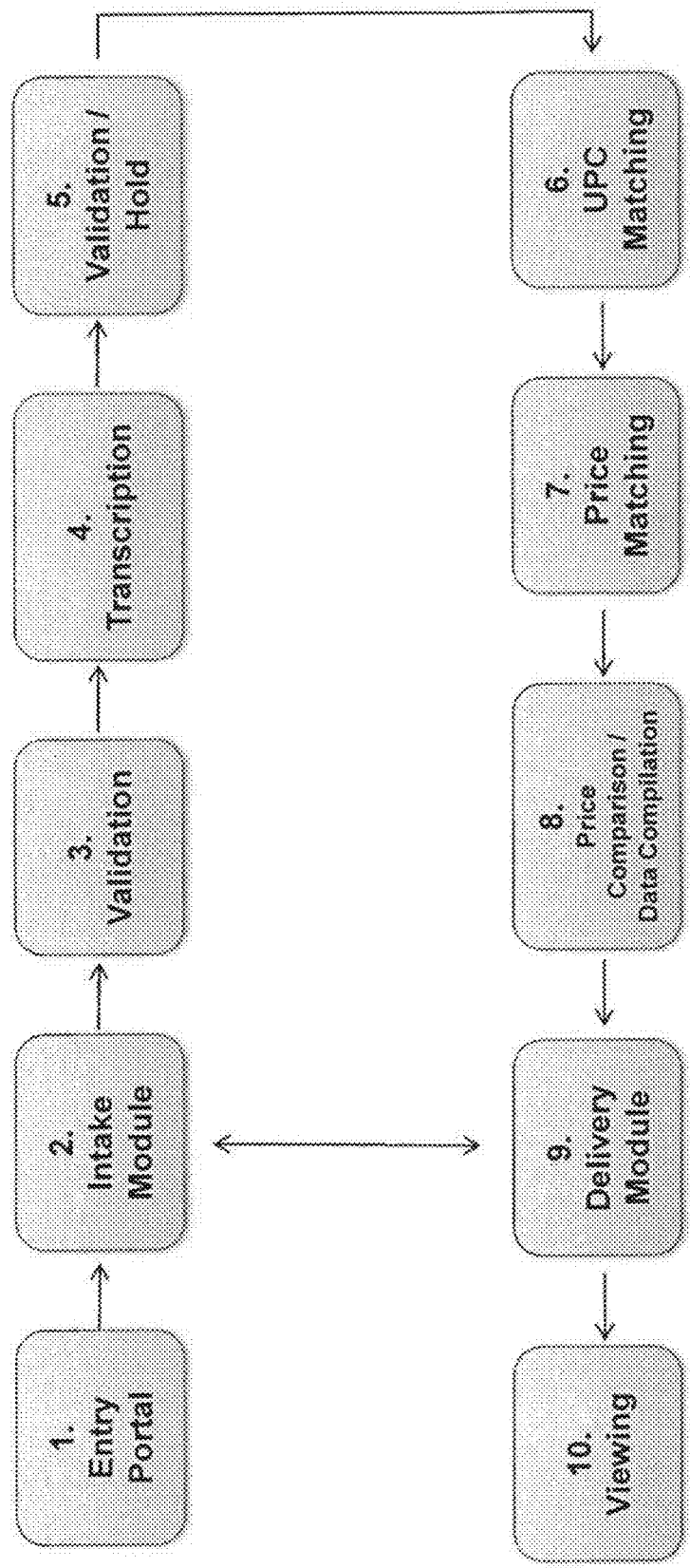
FIG. 9 is a flow chart illustrating the price comparison system and method according to the invention.

FIG. 9 provides a flow chart for the price comparison aspect of the invention. After the consumer initiates the process by uploading and submitting the receipt at the entry portal (box 1), the receipt image 20 and the consumer's contact information (e.g., email address) are sent to an intake module where the image is assigned a unique identification number and is date stamped (box 2). A data file is created that contains the receipt image and the unique identification number. This data file then flows through the rest of the process where additional data is added to the data file in a machine readable and searchable format.

The form of the data file is not critical to the practice of the invention. For example, attaching the image file to an Excel spreadsheet, which is then transferred from point to point through the process, is an acceptable method of practicing the invention. As with the other aspects of the invention any data transfer, especially those between the invention and the consumer, should use a secure protocol for privacy concerns. Similarly, in preferred embodiments the customer's contact information is not added to the image data file and remains in the intake module. The removal of the customer contact information is not necessary to practice the invention but is a preferred practice for general customer privacy reasons. This is especially true if any of the individual steps of the invention are performed by third-party contractors.

Box 3 of FIG. 9 represents one of several validation steps in the process. The term validation, as used herein, means that the data file undergoes an internal quality control check to make sure that the file, process, or data are functioning properly and suitable for further processing.

For example, immediately after the image is uploaded it is checked to see if it is in a form that is supported by the system (e.g., a jpeg) and is capable of being opened and read. This validation step can be automated, done manually or some combination of the two. This step (along with the other steps) can be part of a system implemented solely by the merchant or it can be out sourced to third party vendors.

The next step in the process, represented by box 4 in FIG. 9, is to transcribe the purchase data contained in the receipt and organize it into a form that can be searched by a computer program. At this time, manual transcription of receipt data is preferred to improve the quality and accuracy of the data provided to the consumer. In most instances this will occur offshore to reduce costs.

Eventually, it is believed that optical characters recognition (OCR) will be used to scan the images of the receipts, transcribe them, and organize the data necessary to practice the invention. Currently OCR technology is not at the point where it can consistently and accurately recognize data that is printed on all retail receipts. This is due to several factors such as the poor print found on many receipts, consumers wrinkling receipts as they are placed in pants pockets, etc., and poor images.

The transcription step is followed by a quality control step represented by box 5 in FIG. 9. It should be noted that the activities the occur in boxes 4 and 5 can be combined in one step but are discussed separately here to better highlight the progression of the method according to the invention. Alternatively, the entire price matching aspect of the invention can be combined in one system and done in one "step."

As the transcription process takes place various data points are checked for validity and compatibility with the remaining process steps. For example, if the date of the receipt is too old for a legitimate comparison, the data file is flagged for closer review later in the process. Similarly, if the price of an item appears disproportionately low (e.g., a HDTV for $1) the data file is flagged. If the price of an item or items is unreadable the data file is flagged. If the image was too poor for transcription the data file is flagged. The flagging criteria can be set by each entity that practices the invention.

Data files that are flagged are reviewed to determine the relative scope of the data file deficiencies. If there are too many deficiencies (e.g., multiple items not transcribed) or if there is a major deficiency (e.g., unable to identify store name or purchase date) the data file is removed from further processing. The data file with its unique identification number is returned to the intake module (box 2) where it is combined with the consumer's email address. The consumer then receives a message (via email or other electronic message) notifying the consumer that their request was terminated. The reason for termination can be added to the message sent to the consumer. Box 6 represents the UPC matching step of the invention. As noted in the discussion of the price matching aspect of the invention, the data contained on retail receipts is not uniform across merchants. Thus, in many instances a straight transcription of the retail purchase data provides little indication regarding what the product actually was. For example, FIG. 1B lists "stain pen" as an item with a store specific SKU beside it. Is this a TIDE brand pen or a CLOROX brand pen? What size is the pen? Unless one has a database containing item and price data for the merchant in question it would be difficult to make an accurate price comparison with any other merchant just based on the receipt data.

Therefore, the price comparison aspect of the invention also utilizes competitor's pricing data contained in the second electronic database 26 discussed in the price matching aspect of the invention. After the receipt purchase data is transcribed and added to the data file, the data file is electronically transferred to a UPC matching module (box 6) which contains, is connected to, or has access to the second electronic database 26. The UPC matching module also contains a suitable CPU or other computerized hardware necessary to conduct machine implemented search and data comparison of the second electronic database 26.

The data in the data file is computer searchable (e.g., text entered into an Excel spreadsheet) and is compared to the data found in the second electronic database 26 to match the item or items printed on the first merchant's (competitor's) receipt to a UPC code. This matching process can occur using both automated and manual means. For example, if the receipt purchase data found in the data file contains the first merchant's name and a SKU, the UPC matching module, which is electronically searchable, executes the appropriate algorithm and pulls the UPC code associated with that merchant's SKU. If the SKU is not available an algorithm based on keywords can match UPC codes to item specific purchase data in much the same manner as the data comparison engine 38 utilized in the price matching aspect of the invention.

As with the price matching aspect of the invention, determining a "match" between item and UPC code can be based on a set of criteria chosen by the practitioner of the invention. If 3 of 4 or 4 of 5 criteria match (e.g., merchant name, item name, size, SKU, price, location), the item is matched to a UPC code which is added to the data file in a searchable format.

If the UPC matching module fails to match an item contained in the data file with a UPC code the data file is so noted. For example, the entry "no match found" is entered into the data file which is presented to the consumer if desired.

Alternatively, manual review of the data file and manual price matching can occur. Manual review and matching can be used randomly as a quality control measure for the automated searches or it can be used more frequently in an attempt to eliminate or reduce the number of "no match found" entries. For example, a human may be able to match a description and price contained in the purchase data with a picture of an item found on a sales circular and then match the sales circular to a UPC code.

Regardless of the method utilized to obtain UPC code data, at the end of the UPC matching module (box 6) the data file contains a list of UPC codes that are matched to one or more items contained on the first merchant's receipt on an item-by-item basis ("the first merchant UPC code list"). The data file, containing the first merchant UPC code list is then forwarded to a price-matching module represented by box 7.

The price matching module is a computer operated search engine similar to the UPC matching module and the same CPUs and hardware that are used in the other searching/matching steps of the invention can run the price matching functions as well. Alternatively, the price matching function can run on separate servers, hardware, and software. In FIG. 9 the price matching module is identified as a separate box to highlight this aspect of the invention.

The price-matching module uses a computerized system to match the first merchant UPC code list to UPC codes contained in the second merchant's pricing database. The algorithms utilized in the price-matching module search the second merchant's pricing database to locate the second merchant's store that is closest to the first merchant's store where the items were purchased.

Once the closest second merchant store is located the first merchant UPC code list is compared with the UPC codes sold at that store, preferably on the date of the consumer's purchase. If UPC matches are found, the second merchant's prices associated with those matched UPC codes are added to the data file.

The data in the data file is then organized and compiled in a price comparison module (box 8). As with the other modules, this module comprises a CPU, hardware, and software necessary to read data contained in the data file and perform the necessary mathematical calculations and data presentations. This module may be a stand-alone module or it can be conducted by any of the computer hardware and software utilized by the other modules.

The price comparison module calculates the number of compared items and the item-by-item price difference between the first merchant's prices and the second merchant's prices for each item. Other mathematical calculations such total savings or percent savings, etc., desired by the practitioner merchant are performed and the results are added to the data file. The price comparison module also takes the price comparison data and places it in a form suitable for delivery to the consumer. For example, the price comparison data can be placed in a text file, Excel spreadsheet, html file, etc.

The price comparison data is then transferred to a delivery module (box 9) that matches the price comparison data and the unique identification number to the consumer's email address which was separated from the data file in the intake module. The delivery module notifies the consumer that the price comparison process is complete and that the consumer can view the results.

In preferred embodiments of the invention the consumer is directed to view the results by logging onto the second merchant's website to reinforce the psychological tie between the second merchant and lower prices. Alternatively, the results can be sent via any electronic means including but not limited to email and in any form desired by the practitioner.

Figure 10:
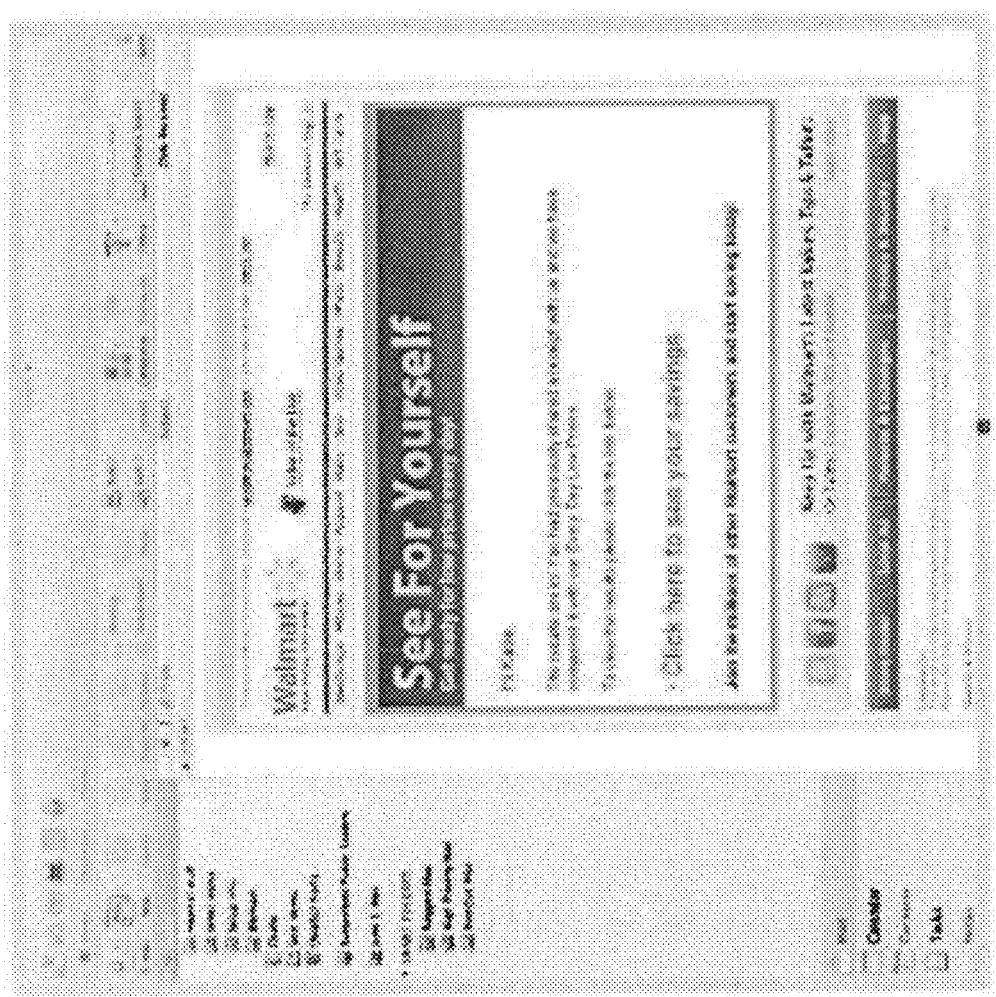
FIG. 10 illustrates a possible consumer experience where the consumer receives the results of the price comparison system and method according to the invention.
Figure 11:
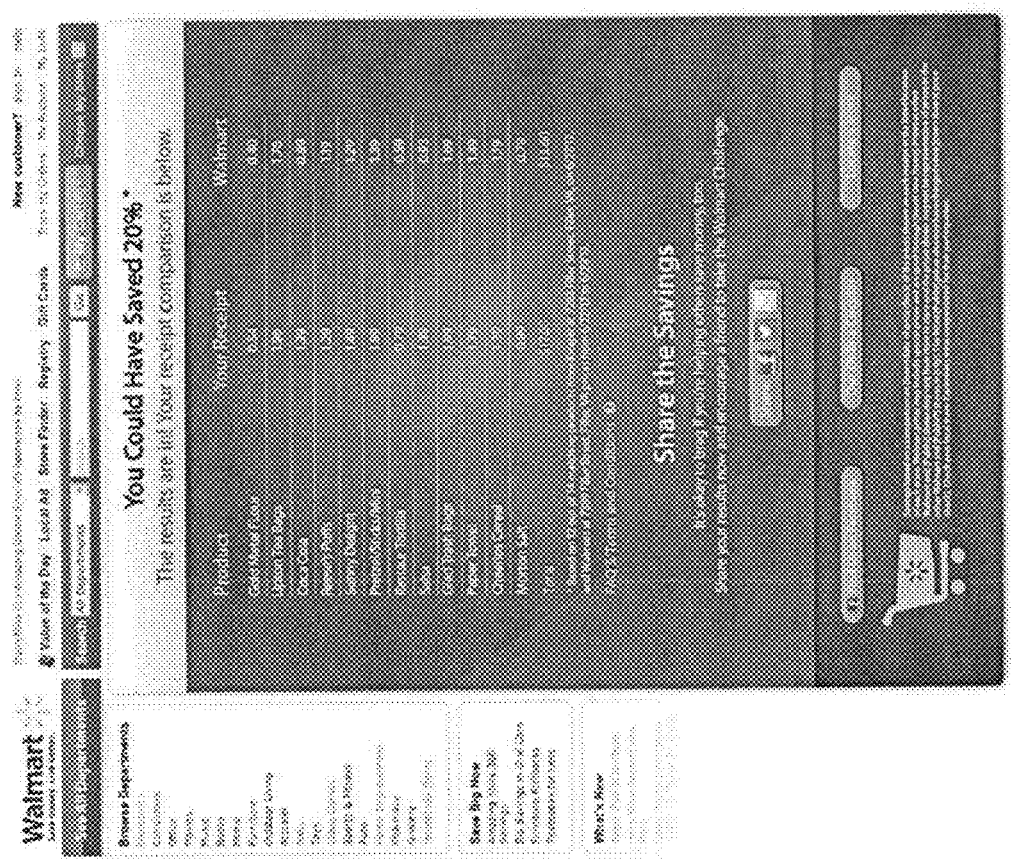
FIG. 11 illustrates a possible consumer experience where the consumer receives the results of the price comparison system and method according to the invention.

FIG. 10 is an illustration of an email notifying the consumer that the price comparison results are ready and available for viewing by logging onto the merchant's website. FIG. 11 is an illustration of one possible presentation of the price comparison data organized and compiled in the price comparison module (box 8). In preferred embodiments the data set presented to the consumer comprises (a) a list of items purchased at the first merchant, (b) the price for items purchased at the first merchant, and (c) the price offered by the second merchant for at least one item purchased at the first merchant, among other data parts of information. The data shown in FIG. 11 is in a HTML format and contains social media links such as those that are standard in merchant's online marketing strategies.

Figure 12:
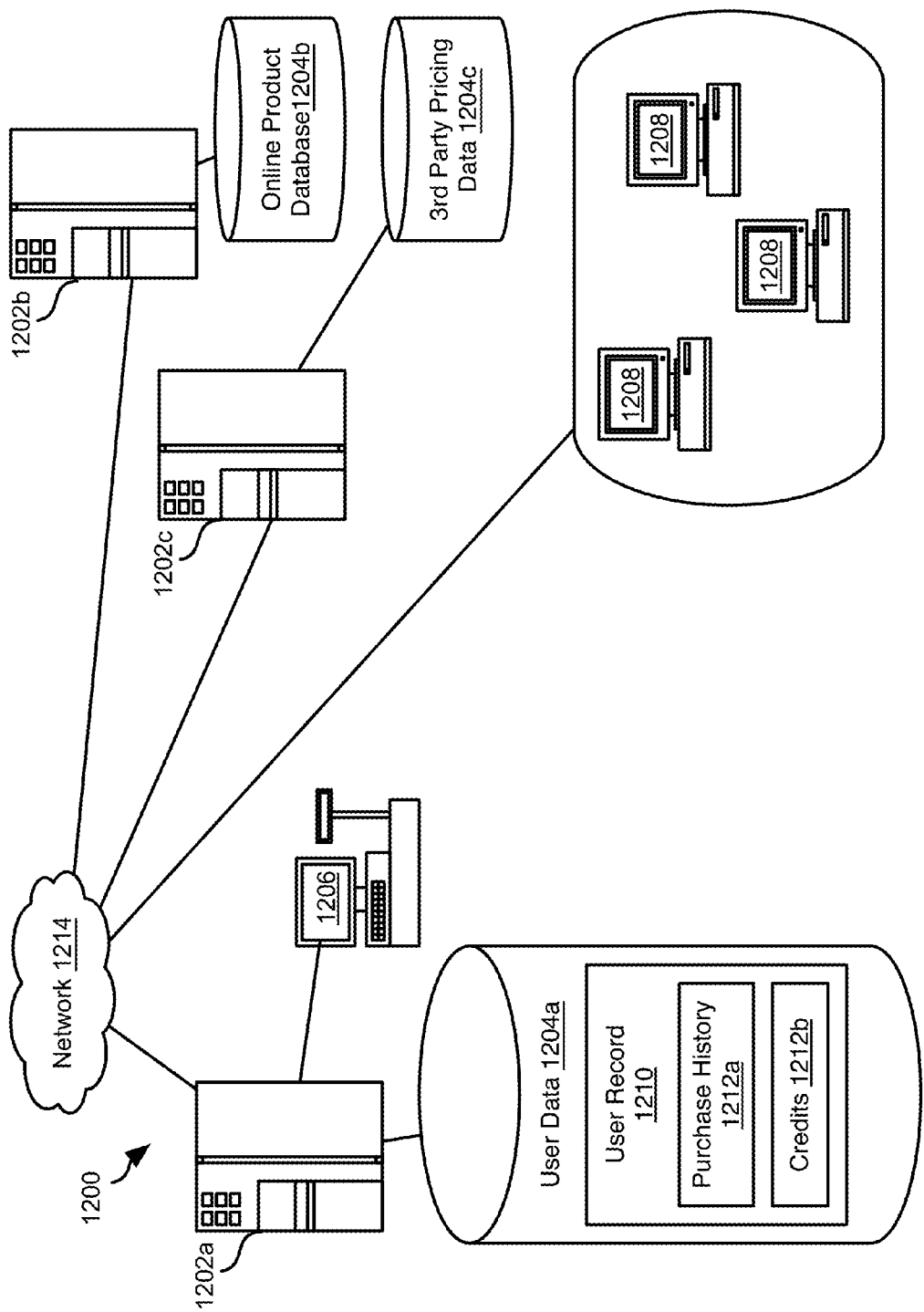
FIG. 12 is a schematic block diagram of a network environment suitable for implementing methods in accordance with embodiments of the invention.

Referring to FIG. 12, a network environment 1200 may be used to implement methods as described herein. The environment 1200 may include a server system 1202*a* associated with a corporate parent or controlling entity having one or more retail establishments associated therewith. The retail establishments may house point of sale devices (POS) 1206 on which transactions may be concluded. Records of transactions may be transmitted to the server system 1202*a* by the POSs 1206 at the various retail establishments.

In some embodiments, data regarding third parties and used according to the methods disclosed herein may be gathered from various sources. For example, a server 1202*b* of one entity may provide a website providing access to an online product database 1204*b*, which may include access to product records including product prices and corresponding product identifiers and other descriptive information. A database 1204*b* may also include a publicly accessible website or the like listing advertisements for products offered for sale in a retail establishment.

In some embodiments, data regarding third parties may be obtained from a server system 1202*c* operated by a data gathering entity. For example, the server system 1202*c* may store third party pricing data 1204*c*. The pricing data may include data gathered from advertisements published by retail entities. Pricing data may also be gathered by research of on-the-shelf prices independent of any advertisement or promotion. Pricing data could include entries including fields such as an entity identifier, location, price, product identifier (e.g. UPC), a date the product was offered at the price, or the like. The pricing data may be gathered and be provided within N day or hours from when it was published. For example, pricing data may be provided the next day, 48 hours, or 72 hours, after initially publicized.

The server system 1202*a* may access and use user data 1204*a*, which may include a plurality of user records 1210. A user record 1210 may be associated with a particular user who may be identified by a unique customer identifier. The user may have access to some or all of the data in the user record 1210 (e.g. by means of a user account associated with the user record) and a user name and password may be associated with the user record and with which a user may log in the server system 102*a* in order to obtain access to the user record 1210.

The user record 1210 may include such data as a purchase history 1212*a* including a record of previous transactions conducted by the user associated with the user record 1210 at the various POSs 1206 associated with the server system 1202*a*. The user record may further include a record of credits 1212*b* assigned to the user associated with the user record as well as a redemption or usage of such credits. The methods by which the credits 1212*b* are assigned and used are described in greater detail below.

Customers may access the server system 1202*a* in order to participate in the methods described herein by means of user computing devices 1208 that may be embodied as desktop or laptop computers, tablet computers, smart phones, or the like. Communication among servers 1202*a*-1202*c*, POS 1206, and workstations 1208 may occur over a network 1214 such as the Internet, local area network (LAN), wide area network (WAN) or any other network topology. Communication may be over any wired or wireless connection.

Figure 13:
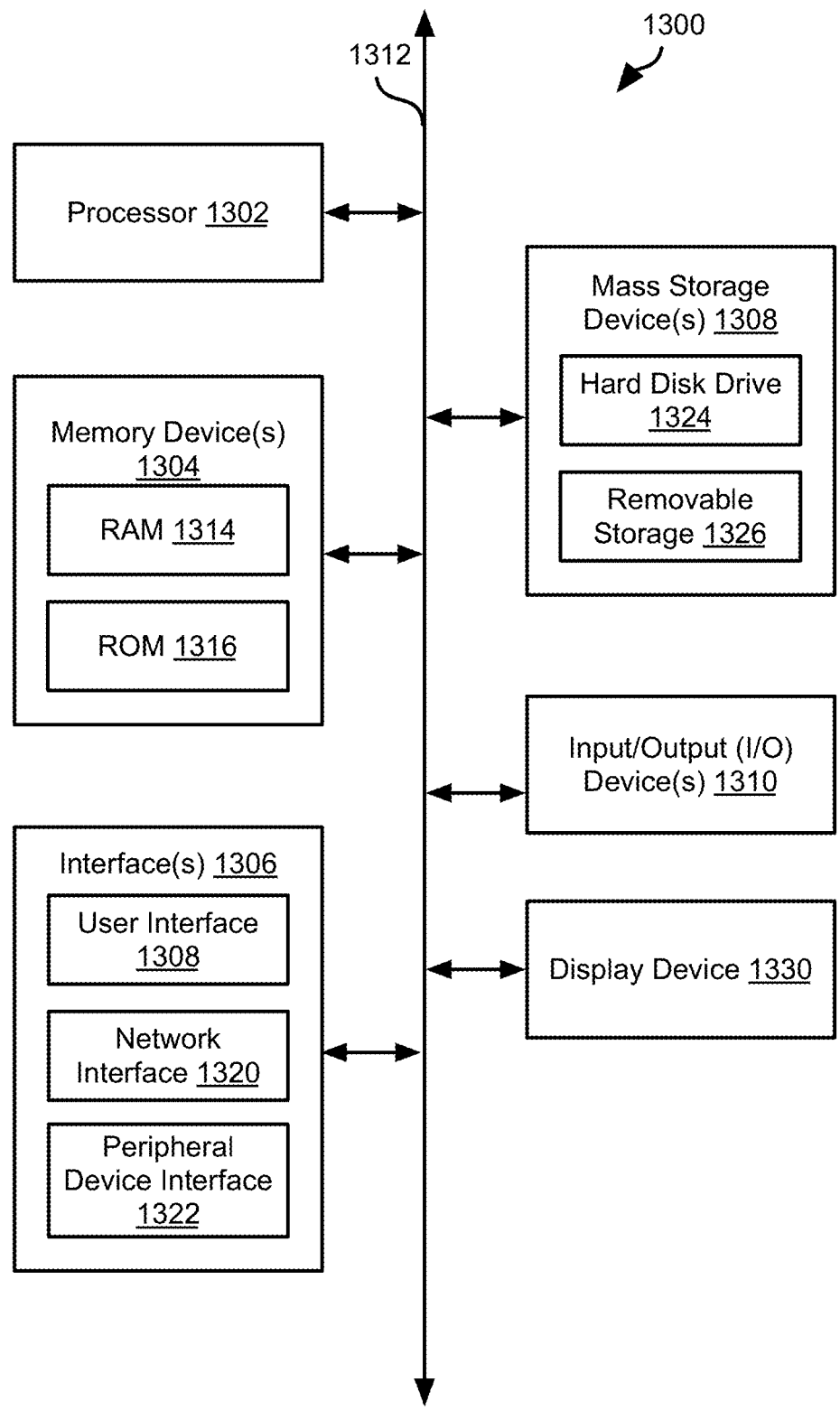
FIG. 13 is schematic block diagram of a computer system suitable for implementing methods in accordance with embodiments of the invention.

FIG. 13 is a block diagram illustrating an example computing device 1300. Computing device 1300 may be used to perform various procedures, such as those discussed herein. A server system 1202*a*-1202*c*, POS 1206, and user computing device 1208 may have some or all of the attributes of the computing device 1300. Computing device 1300 can function as a server, a client, or any other computing entity. Computing device can perform various monitoring functions as discussed herein, and can execute one or more application programs, such as the application programs described herein. Computing device 1300 can be any of a wide variety of computing devices, such as a desktop computer, a notebook computer, a server computer, a handheld computer, tablet computer and the like. A server system 1202*a*-1202*c* may include one or more computing devices 1300 each including one or more processors.

Computing device 1300 includes one or more processor(s) 1302, one or more memory device(s) 1304, one or more interface(s) 1306, one or more mass storage device(s) 1308, one or more Input/Output (I/O) device(s) 1310, and a display device 1330 all of which are coupled to a bus 1312. Processor(s) 1302 include one or more processors or controllers that execute instructions stored in memory device(s) 1304 and/or mass storage device(s) 1308. Processor(s) 1302 may also include various types of computer-readable media, such as cache memory.

Memory device(s) 1304 include various computer-readable media, such as volatile memory (e.g., random access memory (RAM) 1314) and/or nonvolatile memory (e.g., read-only memory (ROM) 1316). Memory device(s) 1304 may also include rewritable ROM, such as Flash memory.

Mass storage device(s) 1308 include various computer readable media, such as magnetic tapes, magnetic disks, optical disks, solid-state memory (e.g., Flash memory), and so forth. As shown in FIG. 13, a particular mass storage device is a hard disk drive 1324. Various drives may also be included in mass storage device(s) 1308 to enable reading from and/or writing to the various computer readable media. Mass storage device(s) 1308 include removable media 13226 and/or non-removable media.

I/O device(s) 1310 include various devices that allow data and/or other information to be input to or retrieved from computing device 1300. Example I/O device(s) 210 include cursor control devices, keyboards, keypads, microphones, monitors or other display devices, speakers, printers, network interface cards, modems, lenses, CCDs or other image capture devices, and the like.

Display device 1330 includes any type of device capable of displaying information to one or more users of computing device 1300. Examples of display device 1330 include a monitor, display terminal, video projection device, and the like.

Interface(s) 1306 include various interfaces that allow computing device 1300 to interact with other systems, devices, or computing environments. Example interface(s) 1306 include any number of different network interfaces 1320, such as interfaces to local area networks (LANs), wide area networks (WANs), wireless networks, and the Internet. Other interface(s) include user interface 1318 and peripheral device interface 1322. The interface(s) 1306 may also include one or more user interface elements 1318. The interface(s) 1306 may also include one or more peripheral interfaces such as interfaces for printers, pointing devices (mice, track pad, etc.), keyboards, and the like.

Bus 1312 allows processor(s) 1302, memory device(s) 1304, interface(s) 1306, mass storage device(s) 1308, and I/O device(s) 1310 to communicate with one another, as well as other devices or components coupled to bus 1312. Bus 1312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1300, and are executed by processor(s) 1302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 14:
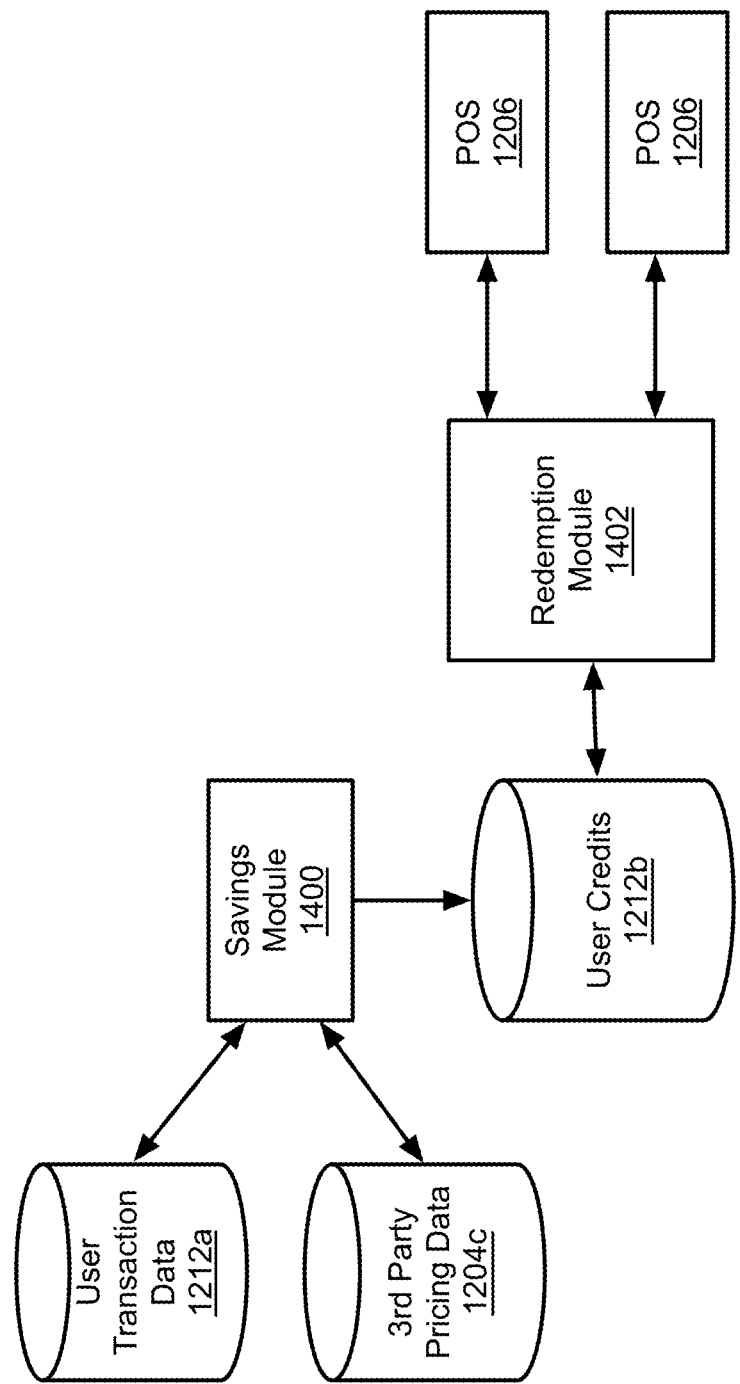
FIG. 14 is a schematic block diagram of components implementing methods in accordance with an embodiment of the present invention.

Referring to FIG. 14, a savings module 1400 may ingest data such as a transaction record (e.g. receipt) from among user transaction data 1212*a*. A transaction record may include such information as a transaction identifier uniquely identifying the transaction, a date and time of the transaction, a user identifier identifying the customer that conducted the transaction, a POS identifier indicating the POS device at which the transaction was conducted, a store identifier indicating a store where the transaction was conducted, a listing of item identifiers, a price paid for each item identifier, taxes paid for specific items or the transaction as a whole, listings of discounts applied to one or more item identifiers, and like information. In some embodiments, the transaction identifier may encode or be stored in a location that indicates the store, POS, transaction date, or other information describing the transaction.

The savings module 1400 may further take as input third party pricing data 1204*c*. The third party pricing data 1204*c* may be pricing data from different entities than the entity that conducted the transaction represented by the transaction record. The third party pricing data 1204*c* may be data that reflecting prices offered on a same day as a date on which the transaction represented by the transaction record took place. As noted above, this third party data may be provided by data gathering service. The savings module 1400 compares the prices of items in the transaction record to prices for corresponding items in the third party pricing data 1204*c*. The savings module then assigns user credits 1212*b* to an account of the user associated with the transaction or otherwise attributes credits 1212*b* to the user.

A redemption module 1402 may interact with one or more POSs 1206 to apply the credits to subsequent transactions. For example, the redemption 1402 may issue a gift card, code for a gift card, assign credits to a gift card, or otherwise provide a message containing information that a user may use at a POS 1206 in order to apply the credits to a transaction. The gift card, code, credit applied to an account of a user, or other representation of the credit, may be applied toward the entity at which the transaction was conducted that resulted in the assignment of the credit. In some embodiment, the credit may also be applied to transaction at a different entity. The redemption module 1402 may interact with the POS 1202 in order to validate a gift card, code, or other representation of credits presented at the POS 1206 when processing payment for a transaction. For example, a cashier or device may receive the code, scan the gift card, swipe the gift card through a magnetic reader, or otherwise input a representation of the gift card into the POS 1206. The POS 1206 may then transmit this information, or a representation thereof, to the redemption module 1402. If the transmitted information is valid, the redemption module 1402 may transmit authorization to the POS 1206 to apply corresponding credits to the transaction. Otherwise, the redemption module 1402 may transmit a rejection of the transmitted information and the POS 1206 will not apply any corresponding credits to the transaction.

Figure 15B:
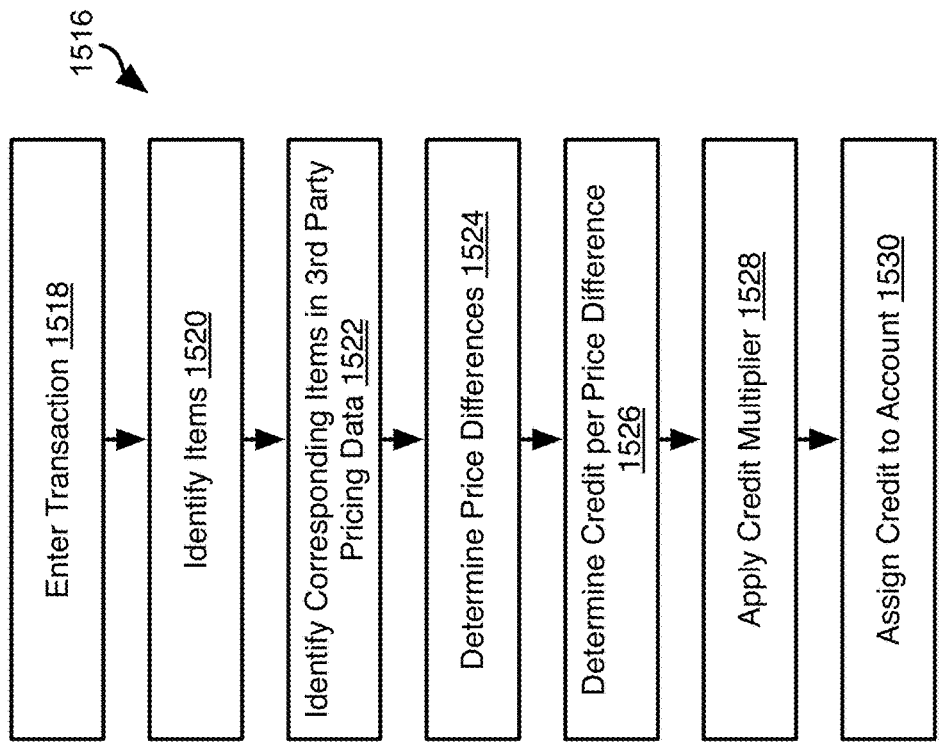
FIGS. 15A through 15C are process flow diagrams of methods for providing customer savings in accordance with an embodiment of the present invention.
Figure 15A:
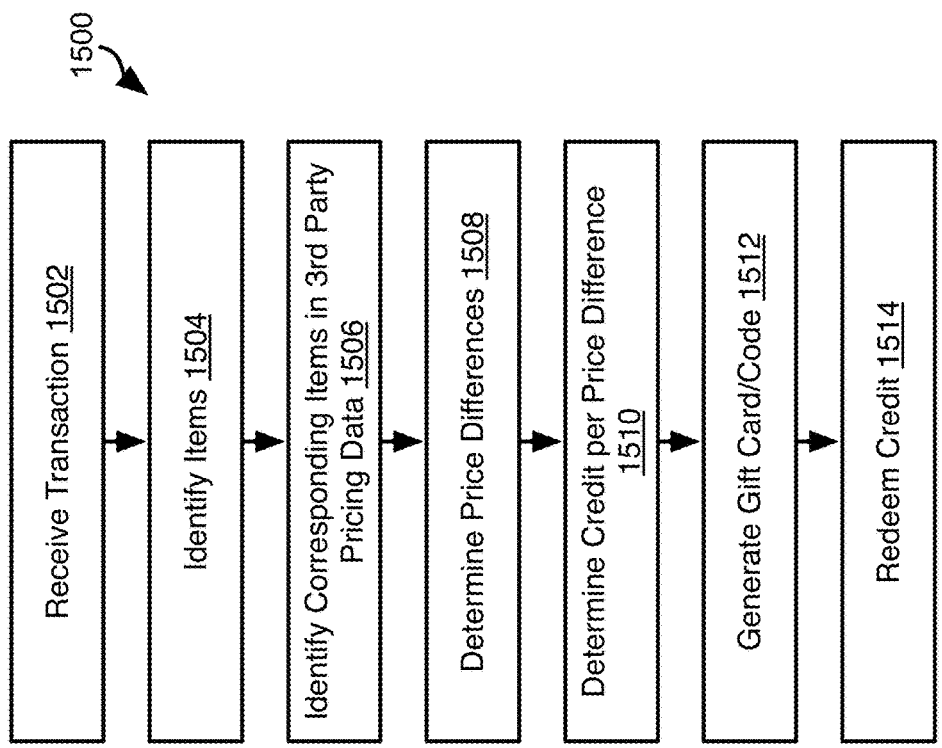

FIG. 15A illustrates an example of a method 1500 that may be used to provide credits to users based on price difference between a price paid and third party prices. The method 1500 may include receiving 1502 a record of a transaction. A record of a transaction may include such data as a date of the transaction, a location where the transaction occurred, an identifier of the POS at which the transaction occurred, an identifier of the customer that was a party to the transaction, and other information. The transaction record may further include various <product,price> entries that list a product identifier and a price paid for the product corresponding to that product identifier. Other data may include taxes paid for the entire transaction and/or for specific item identifiers. Any discounts due to coupons or price matching may also be noted for each item identifier for which such price adjustments were applied. The transaction record may be transmitted from a POS 1206 to a server system 1202*a*. The transaction record may additionally or alternatively be transmitted to a customer in electronic form and/or by means of a printed copy. The transaction record may be associated by the server system with the user data 1210 of a user with whom the transaction was conducted, such as using a credit card number or identifier supplied to the POS at the time of concluding the transaction and included in, or associated with, the transaction record. For example, the transaction record may be in the form of an electronic receipt provided to the customer.

The step of receiving 1502 the receipt may include receiving a transaction identifier from a user computing device 1208 through a portal such as a website hosted by the server system 1202*a*. The transaction identifier may uniquely identify the transaction record and may be printed on a paper receipt to enable the customer to take advantage of the methods disclosed herein and/or for other purposes. Receiving 1502 the receipt may include receiving, by the server system 1202*a*, a selection of the transaction in a listing of transactions presented in a portal provided by the server system 1202*a* or by an application for viewing receipts stored locally on a user computing device 1208. For example, transactions may be made available to a user in the form of electronic receipts stored in an account of a user and recording transactions conducted by the user. In some embodiments, all transactions of a user may be submitted for review according to the method 1500. For example, where a user has installed a mobile application for interfacing with the server system 1202*a*, all transactions of a user may be automatically submitted for review according to the method 1500. In some embodiments, transactions may be transmitted to the server system by 1) the user scanning a bar code or other optical code printed on a receipt with a user device 1208, 2) the user device 1208 transmitting some representation of the optical code to the server system 1202*a* and 3) the server system 1202*a* identifying a transaction record corresponding to the transmitted representation of the optical code.

In some embodiments, the server system 102*a* may limit a number of receipts that may be submitted by a customer, e.g. for a specific user account. For example, N transactions may be process per week for the customer. In some embodiments, multiple limits on receipts for multiple corresponding time period may be imposed. For example, only N transactions per week or M transactions per month may be allowed by the server system 102*a* to be processed according to the methods described herein for purposes of determining a credit based on price differences.

The method 1500 may further include identifying 1504 from the received transaction record the item identifiers of items purchased as part of the transaction and the price for each item. For example, fields of the form <item identifier, price paid> may be filled with the item identifier and purchase price for some or all items listed as having been purchased in a transaction record. The item identifier may be a proprietary product identifier for a product catalog of a merchant or a universal identifier (e.g. a universal product code (UPC).

For some or all of the identified 1504 items, corresponding items may be identified in third party pricing data. In particular, a lowest price for each item identifier may be identified among the third party pricing data. As noted above, pricing data may include advertised prices exclusively. Pricing data may also include the sale price for some items regardless of whether that price is advertised, e.g. an every day, on the shelf price for an item at a third party retail outlet. Pricing data searched to identify corresponding third party prices may be limited to pricing data for retail stores within a threshold proximity of the POS or retail location identified by the transaction record that is the subject of the method 1500. For example, the threshold may reference a geographical or political region (neighborhood, city, county, state, etc.) or may specify a circular area having a radius R with respect to the POS or store location indicated in the transaction record. In some embodiments, the third party retail outlets chosen for obtaining third party pricing data to compare to a transaction may be selected according to a function that takes into account a third party outlet's distance from the transaction store and the competitive environment of the transaction store. For example, retail stores may also be identified according to an algorithm that analyzes various aspects of the local market including the retail location for the transaction record. For example, in a market where there is a large concentration of stores, the radius R from which third party retail outlets may be selected for comparison may be smaller than for a rural area where stores are more distributed. Other aspects of the environment of the transaction store may also be used to identify third party outlets form which to use pricing data.

Identifying the lowest price among the third party pricing data for each item identifier of at least a portion of the item identifiers in a transaction may include determining a per-unit cost for corresponding items in the third party pricing data. For example, if a product corresponding to an item identifier is offered for sale as a buy N at price P per unit and get M free, then the price of an individual instance of that product maybe prorated to be $(N/(N+M))*P$. This prorated price may then be used for purposes of determining whether a price is the lowest as compared to prices offered for that product by other entities and for comparison with the purchase price for the corresponding item identifier in the transaction record. In some instances, where items are sold by a unit of measure, such as weight, the cost per unit weight for an item may also be determined form the third party pricing data. For example, this approach may be applied to produce, meat, or the products sold by weight, volume, or some other unit of measurement. In some instances, products may be offered for sale at a certain price at limit of N per customer. Accordingly, where a third party promotion imposes such a limit, this limit may likewise be imposed when assigning credits. For example, where a third party price is offered only for N items and a customer buys M items, M being greater than N, the customer may be assigned a credit based on the difference between the purchase price paid for N of the M items and the third party price. For the remaining M–N items a credit may still be assigned if some other promotion or third party price is found to be lower than the purchase price paid.

The method 1500 may further include, for each item identifier of some or all of the item identifiers of the transaction record determining 1508 a price difference between the price paid for the item identifier and a lowest price found for the each item identifier in the third party pricing data. A credit for the transaction record according to the price differences determined at step 408 may then be determined 1510. For example, a credit equal to $P_t-P_3$ may be assigned for each item identifier for which $P_t-P_3$ is a positive number, where to $P_t$ is the price paid as indicated by the transaction record and $P_3$ is the lowest corresponding third party price identified at step 1506 for the item identifier. The sum of the credits for each item identifier as determined 1510 may then be assigned to the user associated with the transaction record, such as by assigning a credit equal to the sum of the credits to an account associated with a same user identifier as included in the transaction record.

In some embodiment, the method 1500 may include generating 1512 a gift card, gift code, coupon, or some other data used to uniquely identify an account to which the credit was assigned or to represent the value of the credit.

In some embodiments, credits assigned according to the methods described herein may be transmitted for display in a portal with listing credits for various transactions. Upon selecting of a transaction a portal may display information about a specific transaction and the credits assigned based thereon according to the methods described herein. In some embodiments, a portal may be displayed summarizing information for a specific transaction, the portal including a map displaying the location of third party stores at which a lower price was found and for which a credit was assigned according to the methods disclosed herein.

The method 400 may further include redeeming 1514 the credit. The credit may be redeemed in any manner known in the art. For example, a code may be transmitted to the user. The code may then be presented at the POS 1206. The code may be input to the POS 1206 that either independently validates the code or transmits it to the server system 1202a. Upon determining that the code is valid, such as by receiving a response from the server system indicating that it is valid, the POS 1206 may apply the corresponding credit to a transaction. The code may include text (letters, numbers, other typographic symbols), an optical code (bar code, quick response (QR) code, or the like). In some embodiments, the server system 1202a may invoke mailing of a gift card to the customer or crediting of an account of the customer that has a card with a magnetic strip encoding an account identifier (e.g. debit card).

Referring to FIG. 15B, in some embodiments, a method 1516 may include steps 1502-1510 as for the method 15A. In the method 1516, a credit multiplier may be applied 1518 to the credit determined at step 1510, e.g. 1.5, 2, 3, or some other integer or floating point value greater than one. In some embodiments, the multiple may be less than one. The credit may then be assigned 1520 to a debit card account. For example, a debit card having a checking account associated therewith or used exclusively by means of a debit card. For example, an AM-EX BLUEBIRD account provided by cooperation between WAL-MART and AMERICAN EXPRESS. In some embodiments, a user may be presented a choice between 1) a gift card or code or other assignment of credit to the user and 2) assignment of a credit to a debit card after applying some multiple. If a user selection of assignment to a debit card is received, such as from a user device 108, the server system 102a may then perform the method 1516 of FIG. 15B. If not, the method 1500 of FIG. 15A may be performed by default.

Figure 15C:
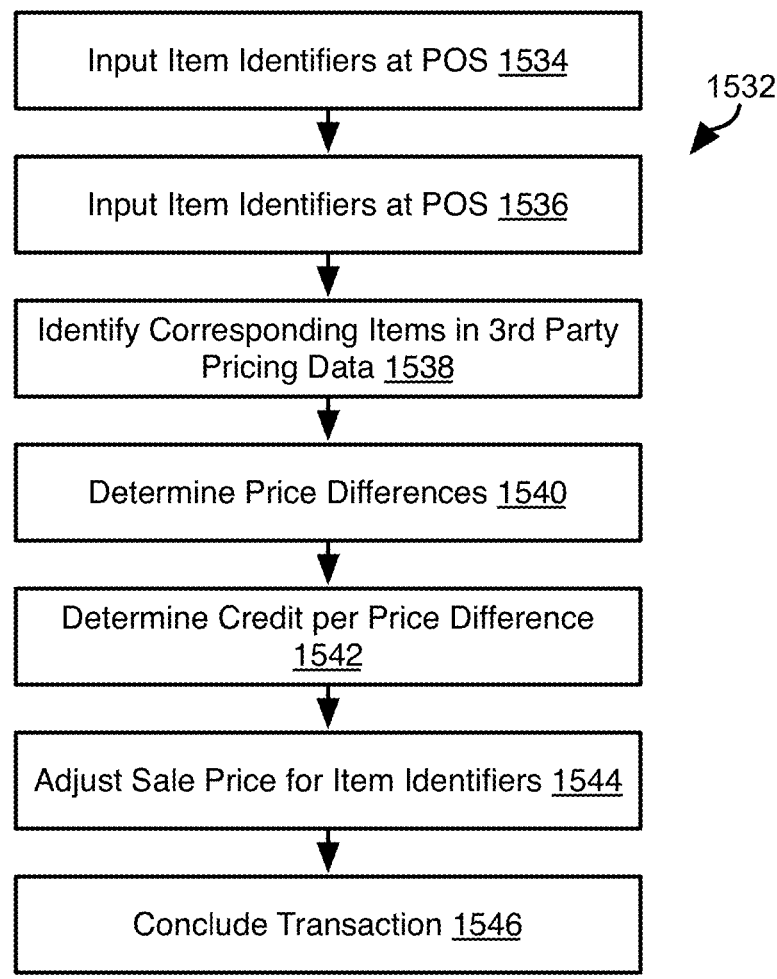

Referring to FIG. 15C, a method 1532 may be executed in order to apply a discount at the time of a transaction. For example, the method 1532 may include inputting 1534 item identifiers into a POS 1206 at a store. Inputting may include any means such as scanning an optical code, receiving typed characters corresponding to an item identifier, scanning an RFID tag, or the like.

The item identifiers may be transmitted 1536 to a server system to evaluate according to the methods disclosed herein, such as the server system 1202a. The server system 1202a may identify 1538 competitor's products corresponding to the item identifiers received at step 1534. The methods by which a competitor's products corresponding to the item identifiers are identified 1538 may include any of the methods disclosed herein.

The method 1532 may likewise include determining 1540 price differences and determining 1542 a credit to assign to the user based on the price differences in the same manner as for other methods described herein. A sale price for the item identifiers may then be adjusted 1544 accordingly. For example, for a given item identifier having a cost of X and an identified corresponding third party product having a price of Y, the sale price for that item identifier may be reduced to Y or some fraction of (X−Y) at step 1544. The transaction may then be concluded 1546 in a conventional manner with the tender of payment being processed by the POS 1206 in the form of tender of cash, processing an electronic transaction using a credit card, or applying a gift card or other credit recognized by the POS 1206, the server system 1202a, or some other entity.

In some embodiments, notwithstanding a discount applied according to the method 1532, a record of the transaction may still be subsequently processed according to the methods described herein to determine if a lower price is available. A credit may be assigned according to the methods disclosed herein in addition to the discount applied at step 1544 with respect to the reduced price paid for a given product.

Figure 16:
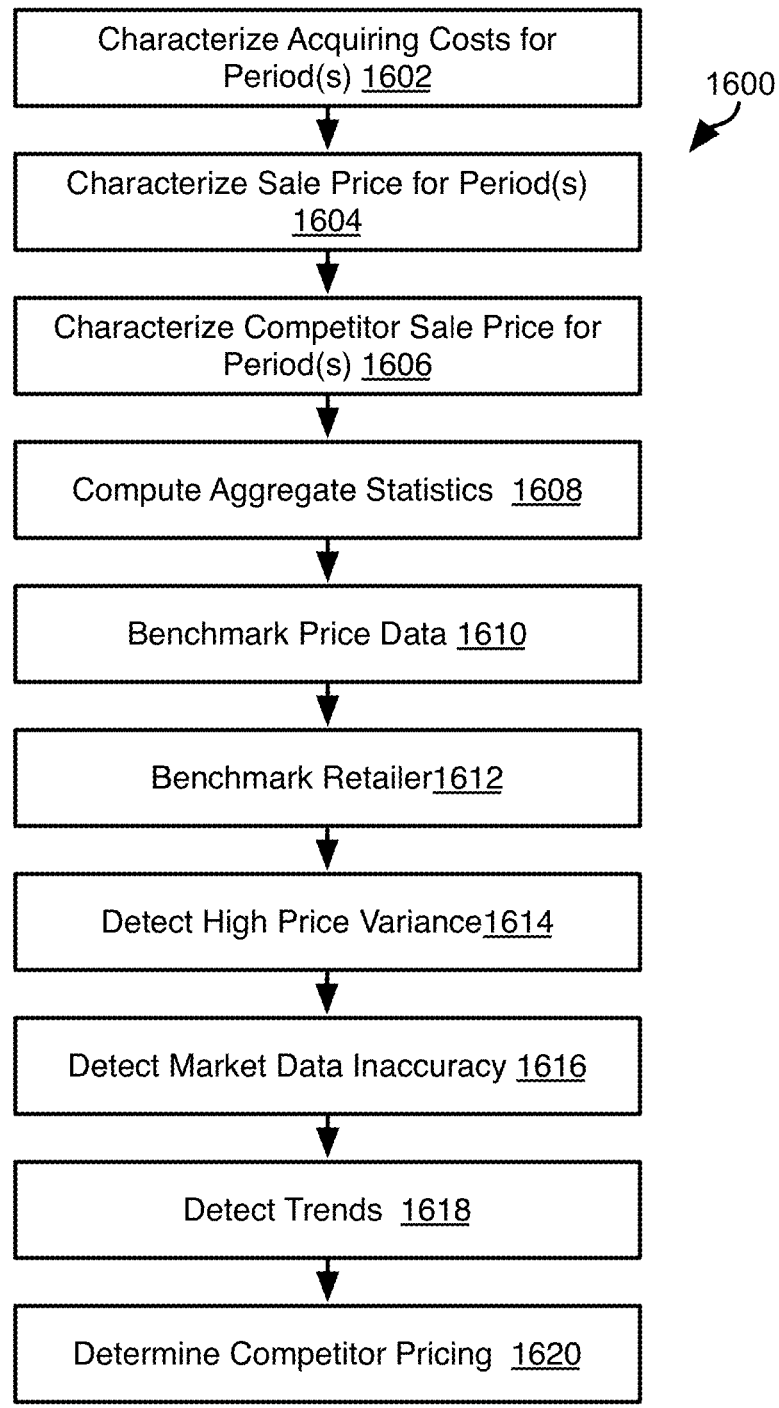
FIG. 16 is a process flow diagram of a method for determining a price difference in accordance with an embodiment of the present invention.

FIG. 16 illustrates a method 1600 that may be used to determine a third party price for purposes of comparison to a purchase price paid according to the methods described herein. As noted throughout the present application, the price paid or about to be paid (see FIG. 15C) for a product may be compared to third party pricing data.

In some embodiments, raw third party pricing data may be processed according to the method 1600 in order to determine an appropriate price for comparison to a price paid for a transaction being evaluated according to the methods disclosed herein. In particular, the method 1600 may be used to validate putative pricing data. The method 1600 may be executed with respect to a specific item identifier. The analysis may be performed at the time of processing a specific transaction including the item identifier (e.g. FIGS. 15A-15C) or periodically in preparation for possible processing of future transactions including the specific item identifier.

The method 1600 may include characterizing 1602 acquiring costs for the item identifier. Acquiring cost may be costs to the entity performing the method 1600. The acquiring cost may also be general, e.g. published or universal, costs for certain products where these are known. Acquiring cost may be the costs of the entity performing the method 1600 to acquire a unit of a product corresponding to the item identifier. For example, where a product is bought at price X for a lot of N instances of the product, an instance of the product being the smallest unit that can be purchased at a time, then the per unit price is X/N. Other acquiring costs, or estimates thereof, such as shipping costs, taxes, financing costs, stocking costs, may also be taken into account in determining the acquiring cost of an individual instances of an item or lot of items. Characterizing 1602 the acquiring cost for an item identifier may include calculating one or more statistical values based on the acquiring cost for the item over time, such as within a window of time. For example, for a given transaction date, the acquiring costs may be determined on different days within some or all a week, two week period, month period, or some other period of time. For example, for each day in a given period, the acquiring cost on that day may be calculated. These values may then be used as a data set to compute a statistical values for the given period. In some instances, acquiring costs do not change day to day such that the acquiring costs may be measured every N days, or on one or more days of a week, within the given period. Statistical values may include such values as a minimum acquiring cost, maximum acquiring cost, average acquiring cost, and/or a variance of the acquiring costs of the data set.

As for other methods described herein, the acquiring costs may be calculated for a given geographic region, e.g. a region including a location at which a transaction being analyzed according to the methods disclosed herein was concluded. For example, acquiring costs for one or more stores within a radius R from the transaction location may be characterized 1602. Alternatively, acquiring costs for the closest store, or closest M stores (M being 2 or more) may be characterized 1602.

The method 1600 may further include characterizing 1604 sale prices for the item identifier. Characterizing 1604 sale prices for the item identifier may include calculating some or all of a minimum sale price, maximum sale price, average price, and variance for the sale price for one or more periods such as a week period, two week period, month period, and/or some other period including a transaction date. The sale prices analyzed may be limited to a geographic area as for step 1602. The sale prices analyzed may include actual prices paid, i.e. prices paid for the item identifier within a given period. In this manner, changes in price due to price matching, application of coupons, or other modifiers to an actual price paid with respect to an offer price may be taken into account.

The method 1600 may include characterizing 1606 competitor sale prices for the item identifier. The competitor's offered prices (e.g. advertised prices) corresponding to the item identifier may be identified according to any of the methods described herein. In some embodiments, prices may be evaluated with respect to an individual retailer, an individual store of an individual retailer, or individual stores of an individual retailer within a geographic limit with respect to a store at which a transaction analyzed according to the methods herein was concluded. Alternatively, sale prices for the item identifier at geographically proximate stores for multiple retailers may be analyzed. The geographically proximate stores for which sale price data may be characterized 1606 may be determined according to the same manner as for step 1602. As for steps 1602-1604, characterizing 1606 competitor sale prices may include calculating some or all of a minimum price, maximum price, average price, variance of price, or other statistical values for one or more periods such as some or all of a week period, two week period, one month period including the transaction date of a transaction analyzed according to the methods described herein.

The method 1600 may further include computing 1608 aggregate statistics. For example, an item identifier may be a node in a product hierarchy. The item identifier may be one of a plurality of product belonging to a category, sub-category, and department in a product hierarchy. Accordingly, for the entity performing the method 1600, the acquiring costs for all item identifiers in a category, sub-category, or department may be aggregated for a given period (one week period, two week period, one month period including the transaction date) and one or more statistical values may be calculated for some or all of a category, sub-category, and department. The statistical values may include a minimum acquiring cost, maximum acquiring cost, average acquiring cost, or other statistical value.

In a like manner, aggregate statistical values for sales prices may be computed for some or all of a category, sub-category, and department for the entity. The sales prices aggregated may be sales prices as defined at step 1604. The statistical values calculated for the aggregated sales values may, again, be calculated for one or more periods (week, two weeks, one month).

In a like manner, aggregate statistical values for sales prices of a competitor (or an aggregation of competitors) may be computed 1608 for some or all of a category, sub-category, and department for the competitor (or aggregation of competitors). The sales prices aggregated may be sales prices as defined at step 1606. The statistical values calculated for the aggregated sales values for the competitor (or aggregation of competitors) may, again, be calculated for one or more periods (week, two weeks, one month). The aggregate statistical values may also be based on geographically limited sale prices as for step 1606.

The method 1600 may further include benchmarking 1610 price data for competitors. The method 1600 may also include benchmarking 1612 the retailer. Benchmarking 1610 pricing data for a retailer may include benchmarking pricing data for a specific retail store within a specified region around a location of a transaction, such as the geographic limits imposed according to other aspects of the methods disclosed herein. As noted above, an aggregate benchmark price may be determined for individual items, categories of items, or items belonging to a particular department among a competitor's third party pricing data, such as using the aggregate statistics of step 1608. A benchmark price for an item, category of items, or items belonging to a given department may also be determined based on seasonality, i.e. the price for a given item within a period of time corresponding to a particular season, e.g., outdoor products in the summer. A benchmark price for an item, category of items, or items belonging to a given department may also be determined for other political or geographic regions such as a particular designated market area (DMZ) zone, state, city, or other region.

The method 1600 may further include detecting 1616 high price variance based on some or all of the aggregate statistics from step 1608 and benchmarks from steps 1610, 1612.

Based on some or all of the aggregate statistics from step 1608 and benchmarks from steps 1610, 1612, the method 1600 may include detecting 1616 market inaccuracy. In particular, if the sale price data of a competitor as characterized at step 1606 does not correspond to the aggregate statistics. For example, competitor pricing data may be gathered and characterized according to the foregoing steps over a long period (e.g. three months, six months, a year, or some other period) and various statistical values for various pricing data levels may be calculated as described above. Pricing data that is out of an expected range will trigger alert. For example, a price that is below a minimum recorded price for an item may trigger an alert or discarding of that price. In another example, a price that is more than one, two, or some other multiple of standard deviations below a mean price for an item, such as characterized above, may be discarded or trigger an alert. Alternatively or additionally, statistical values for each item for each store may be determined. Using these statistical values, a pattern (e.g., price change) that is highly improbable may be deemed incorrect third party pricing. In some embodiment, a third party prices determined to be potentially incorrect may be presented for manual review and/or double checked by a pricing data gathering algorithm used to retrieve third part prices. For items with third party prices that are flagged for review, transactions including these items may be put on hold for certain period (e.g. one day, one week, or some other period). If price information still cannot be validated after that time, credits based on these third party prices may be assigned to customers according to the methods disclosed herein even if the third party price is not confirmed to be correct.

The method 1600 may further include detecting 1618 trends in some or all of the characterizations of steps 1602-1606 and the computed 1608 aggregate statistics. Third party prices that increase more rapidly than a rate of increase indicated by the trends may be flagged for further review or discarded.

The method 1600 may use some or all of the data calculated in steps 1602-1618 to determine 1620 a competitor price for an item identifier and which can be compared to a purchase price for the item identifier in a transaction to determine whether to assign a credit to a purchasing customer as described herein. For example, where a competitor's price on a day of the transaction is determined to not be invalid due to a high price variance or other detected market accuracy, the competitor's price on that day may be used. Otherwise, it may be discarded. Prices of other competitors that are not discarded based on these criteria may then be used to compare to the purchase price in order to determine whether a credit should be assigned and how much the credit should be as described above. For example, if no current price is available for an item, an average third party price for that item may be used for price comparison and a credit assigned according to the methods described herein if the average price is less than a purchase price paid.

In a like manner, aggregate statistical values for sales prices for competitors may be computed 1608 for some or all of a category, sub-category, and department for the entity. The sales prices aggregated may be sales prices as defined at step 1604. The statistical values calculated for the aggregated sales values may, again, be calculated for one or more periods (week, two weeks, one month). The aggregate statistical values may also be based on geographically limited sale prices as for step 1604.

Figure 17:
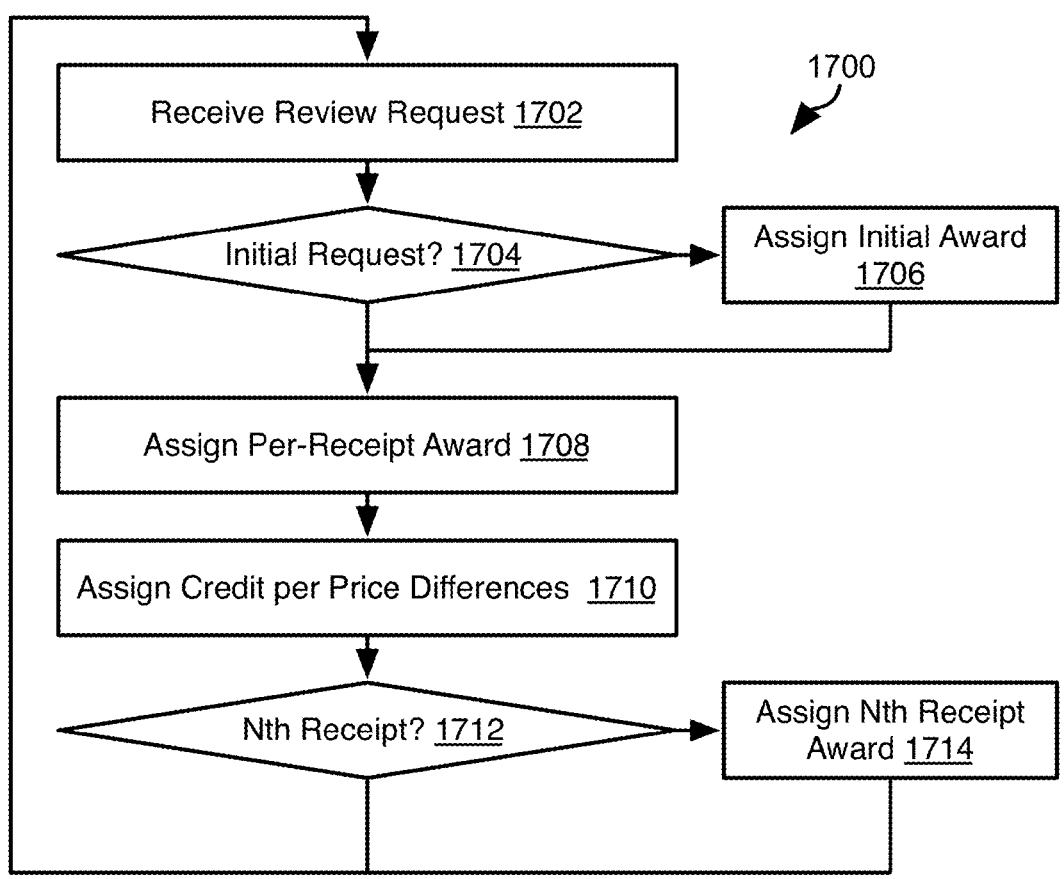
FIG. 17 is a process flow diagram of a method for rewarding submission of receipts in accordance with an embodiment of the present invention.

Referring to FIG. 17, in some embodiment, for some or all transactions processed according to the methods described herein in order to assign credits the method 1700 may also be executed. In some embodiments, transactions may be processed according to the methods described herein upon request of a customer. That is to say the customer may transmit a request to review a transaction record to the server system 1202*a*. The request may include some or all of the transaction record as described above or the transaction identifier that uniquely describes the transaction for which processing according to the methods herein is requested. In some embodiments, the request may be received by means of a portal hosted by the server system 1202*a* that provides access by the customer to electronic transaction records, i.e. electronic receipts of transactions. The request may include interacting with an interface element that is programmed to invoke review of a selected transaction record. As noted above, in some embodiments, an image of a paper receipt is submitted with a request.

The method 1700 may accordingly be invoked for some or all of these requests to review a transaction. The method 1700 may include receiving 1702 a request from a customer (e.g. a user computing device 1208) to review a transaction. If the request to review is found 1704 to be a first request to review a transaction (or the first received in an N month or N week period, N being an integer greater than one) then the method 1700 may include assigning 1706 an award to an account of the customer. Otherwise, the assigning 1706 of the award to the account of the customer may be omitted.

The method 1700 may further include assigning 1708 a per-receipt award. That is to say, for every receipt, or every T receipts (T being an integer greater than 1), an award may be assigned 1708 to the account of the customer.

The method 1700 may include assigning 1710 a credit to the customer based on differences in prices paid for item identifiers in the transaction and third party prices, such as according to some or all of the methods disclosed herein.

In some embodiments, for every N receipts (e.g. N is 5, 10, 15, etc.) submitted an Nth receipt award may be assigned 1714 to the user. The Nth receipt award may encourage a shopper to do all shopping with the entity performing the method 1700.

Assigning 1706, 1708, 1714 an award may include assigning a credit to a user's account. The credits assigned 1706, 1708, 1714 may be independent of the prices for items in the transaction for which a request for review was received 1702 or may be a function of, for example, a total purchase price of the transaction. In some embodiments, assigning 1706, 1708, 1714 the award may include assigning points that may be collected and redeemed for products or other perks, coupons for products, or some other form of non-monetary awards. For example, the award assigned at step 1708 may be Y cents (e.g. $0.03, $0.05, etc.) off per gallon of a gas for a single fill up at a gas station associated with the entity or some other entity. For example, in response to receiving submission of a receipt, a code may be associated with an account of the user and/or transmitted to the user. The code may indicate that the presenter of the code at a gas pump or gas station is entitled to Y cents off per gallon for a fill up or for up to a specific number of gallons of gas. The amounts assigned at the various steps 1706, 1708, 1714 and the type of award (monetary/non-monetary) may be the same or different.

Figure 18:
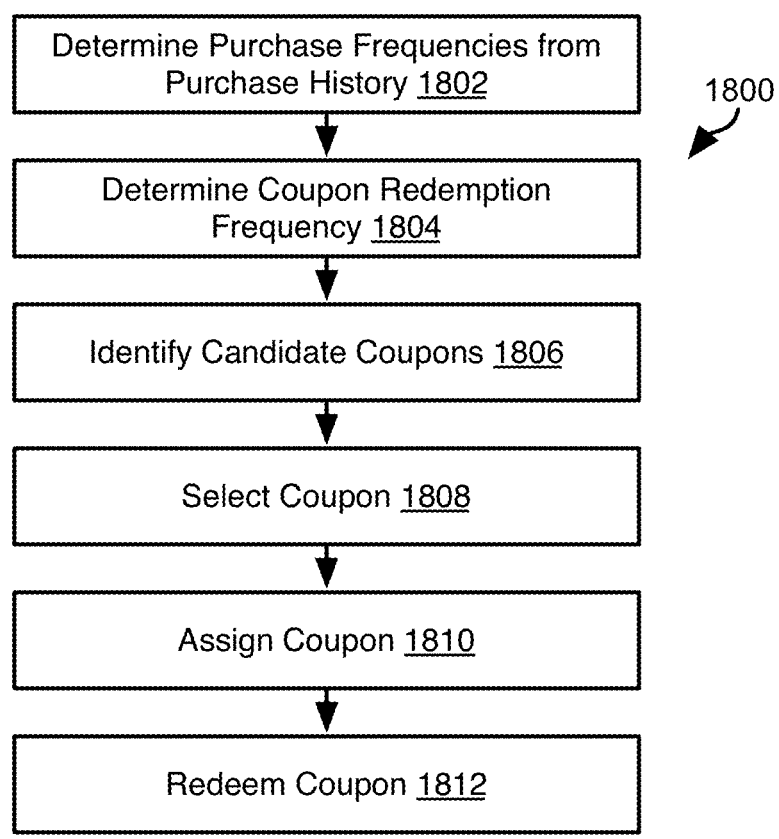
FIG. 18 is a process flow diagram of a method for providing coupons in accordance with an embodiment of the present invention.

Referring to FIG. 18, in some embodiments, coupons may be assigned for some or all requests to review transactions according to the methods described herein. For example, a purchase history 1212*a* of a customer may be analyzed to determine 1802 purchase frequencies. A purchase frequency may be calculated as value indicating that a customer has purchased item A at least M times in the last N days or may be some other function of a frequency with which a customer buys a product, e.g. the customer buys item A at least once every N days.

The method 1800 may further include determining 1804 coupon redemption frequency by a customer. For example, step 1804 may include determining that of N coupons for a given item identifier issued to a customer, M were redeemed by the customer. Step 1804 may additionally or alternatively include determining that the customer redeemed a coupon for product A every N days or redeemed a coupon for product A M times in the last N days. Redemption of coupons may be recorded in the purchase history 1212*a*. For example, coupons may be electronic coupons generated according to the method 1800, promotional codes provided at a POS, paper coupons presented at a POS and recorded at the POS as having been redeemed, or some other record of coupon redemption by the customer.

The method 1800 may further include identifying 1806 candidate coupons. For example, a product catalog may have all products available for generating coupons or only a subset may be flagged as eligible candidates for generating coupons. Each product may be weighted according to one or both of the purchase frequency and coupon redemption frequency for that product as determined at steps 1802 and 1804. For example, these frequencies may be summed, weighted and summed, or otherwise combined to generate a score for a product. The top N products with the highest scores may be selected as candidates for generating a coupon.

The method 1800 may further include selecting one or more products from among the candidate products to generate a coupon. For example, the product with the highest score may be selected. Alternatively, a candidate product for which a greatest amount of savings (e.g. discount) can be provided based acquiring costs, manufacturer coupons, or the like may be selected. Alternatively, a candidate product for which a greatest margin is available for the retailer may be selected. In yet another embodiment, the savings to the customer or retailer margin may be used to select among products having equal scores, otherwise the product with the highest score is selected for generating a coupon. In still other embodiments, a second score may be calculated that is a sum or weighted sum of the first score, the savings to the customer, and the margin to the retailer. The product with the highest second score may then be selected 1808 for generation of a coupon. In still other embodiments, a coupon may simply be selected for a frequently purchase item, e.g. for all products for which a coupon may be generated, that product that product which is purchase most frequently by the user may be the subject of a coupon offered to the customer. In some embodiments, product recommendations may also be generated based on past purchases. For example, products related to, having a better price than, a product the product history indicates that a customer buys with frequency may be presented in a portal in which some or all of the information processed herein is displayed, such as a display of credits assigned according to the methods described herein.

The method 1800 may include assigning 1810 a coupon to a customer. Assigning may include sending an electronic code or other data structure to the customer by means of email, text message, or storage thereof (or a pointer thereto) in the user data 1210 of the customer. Assigning 1810 the coupon to the customer may include assigning a discount amount or percentage for the product selected 1808. The percentage may be a fixed amount (e.g. 10%, 20%, etc.) or determined based on attributes of the product e.g. a function of a price, acquiring cost, popularity, or other factors.

The method 1800 may further include redeeming 1812 the coupon. For example, the customer may present the coupon at a POS. The POS may receive the coupon by scanning a printout of the coupon or an image of the coupon on a user's mobile computing device. The POS may receive the coupon by receiving input of a code identifying the coupon. The POS may then transmit data representing the coupon (e.g. code) the server system 1202*a*, which determines if the code is valid and transmits validation of the code if it is. The server system 1202*a* may further transmit an item identifier and discount amount (or percentage) to the POS. Alternatively, the POS may determine independently from the code itself whether the code is valid as well as the item identifier and discount amount (or percentage) of the coupon. The POS may then adjust a price for the item according to the coupon and conclude the transaction for the adjusted price in a conventional manner.

Figure 19:
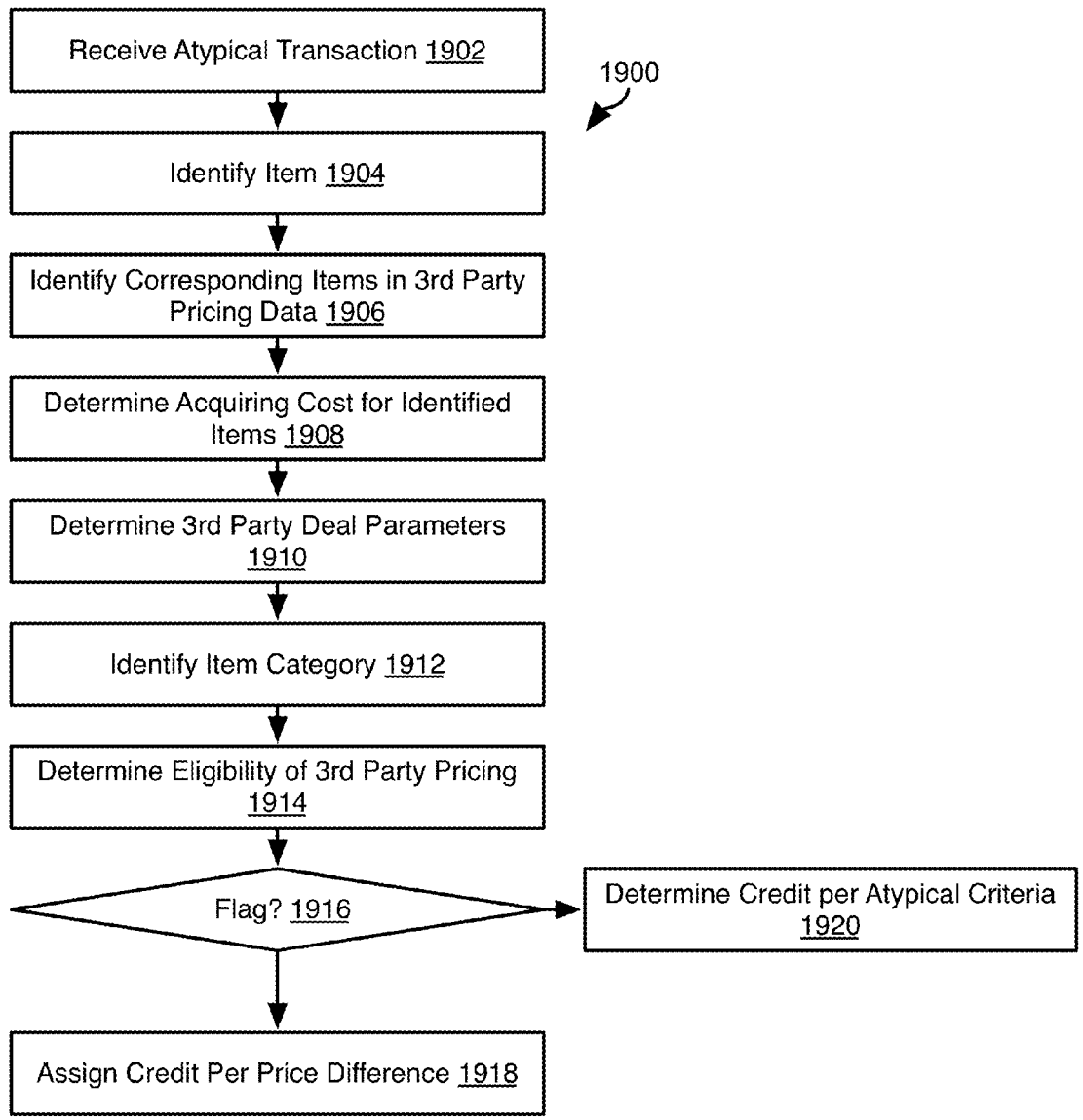
FIG. 19 is a process flow diagram of a method for providing customer savings in accordance with an embodiment of the present invention.

FIG. 19 illustrates a method 1900 that may be used to provide savings to customer on atypical shopping days, e.g. Black Friday, in which deals may be offered by competitors at below cost subject to conditions, e.g. the first 100 shoppers. In such cases, simply comparing prices may not be appropriate. Accordingly, the method 1900 may be used to detect such deals and determine an appropriate credit to assign.

The method 1900 may include receiving 1602 an atypical transaction, i.e. a transaction record of an atypical transaction. An atypical transaction may be a transaction occurring on an atypical shopping day (e.g. black Friday, store opening sale) or the like. An atypical shopping transaction may be identified based on one or more factors such as the transaction meeting some or all criteria such as occurring on an atypical shopping day, including an item having an acquiring cost above an acquiring cost threshold (e.g. expensive electronics or jewelry), having an item with a price determined to be abnormally low (e.g. below acquiring costs or determined to be abnormally low according to the method of FIG. 16), including an item for which an offered price for the item is not available to all customers (e.g., the first N customers to purchase the item in a store on a given day), or some other criteria. For example, a score based on a combination of one or more of these factors, e.g. a weighted sum, may be compared to a threshold. If the score is above the threshold, then the transaction may be determined to be an atypical transaction.

The method 1900 may include executing one or more of steps 1906-1920 with respect to the items of the atypical transaction. In particular, an item identifier of the received 1902 transaction may be identified 1904 from the transaction record and corresponding items may be identified 1906 in third party pricing data effective on the date recorded in the transaction record. The third party pricing data corresponding to the identified 1904 item identifier may be obtained in the same manner as for other methods described herein. In particular, only third party pricing data effective in stores in a defined geographic proximity to a store where the transaction occurred may be used, with the geographic limitation imposed in the same manner as for other methods described herein.

The method 1900 may further include determining 1908 an acquiring cost for the identified 1904 item identifier. Acquiring costs may be determined in the same manner as for the method 1600, described hereinabove.

The method 1900 may further include determining parameters of a deal offered by a third party, i.e. the terms at which the corresponding third party items identified at step 1906 are offered for sale. Terms of the deal may be extracted from structured data that describes the deal as a plurality of <attribute, value> pairs. Possible attributes include the price, a time of day the deal is offered, the dates on which the deal is offered, a maximum number of units per customer, a number of units available for sale under the deal, or other parameters that may limit or describe a deal. Such parameters may also be extracted from an unstructured textual description of the deal using natural language processing techniques or by human conversion thereof into a structured form.

The method may further include determining 1914 a category to which the identified 1904 item identifier belongs. For example, the item identifier may be a node in a product hierarchy and belong in a sub-category of products that itself belongs to one or more other sub-categories or categories up to a departmental category, e.g. Toro model X lawnmower→Toro lawnmowers→lawnmowers→power gardening equipment→gardening equipment. A category, sub-category, department, or individual identifier may have a flag associated therewith. The flag may indicate that item identifiers belonging to the flagged category, sub-category, or department are subject to increased scrutiny on atypical shopping days or for atypical transactions. For example, common food items may not be likely to be the subject of a "door buster deal" whereas some luxury goods, cameras, electronics are more likely to be steeply discounted in order to excite shoppers. Accordingly, items belonging to a flagged category may be scrutinized more closely when in an atypical transaction.

The method 1900 may include finding 1916 whether the identified 1904 item identifier is flagged (e.g. belongs to a flagged category). If not, then a credit may be assigned 1918 to a user based on a difference in a price paid for the identified 1904 item identifier and a lowest third party price.

If the item identifier is found 1916 to be flagged, then the method 1900 may include determining 1920 a credit using an atypical approach. In particular, rather than determining a simple price difference between a third party price and the price paid, additional factors may be used to determine whether to assign a credit and how large the credit will be.

For example, if a third party price is less than an acquiring cost for the item identifier, the credit may be set to zero, a difference between the price paid for the item identifier and the acquiring cost, or a fraction (e.g. 50%) of a difference between the purchase price and acquiring cost.

In some embodiments, deals for an atypical shopping day may be matched that include a gift card, e.g., buy this TV for $100 and get a $10 gift card). In some embodiments, such deals may be matched according to the methods described herein by providing a credit for the lower price plus the incremental amount of the gift card.

In some instances, promotions on an atypical shopping day may be offered during a very limited time window for matching (e.g. only from 10 pm to 12 am). Such deals may be matched according to the methods described herein by using the same window, i.e. applying a credit for a price paid for an item and the promotional price of a third party for that item only for transactions occurring within the same small time window in which the promotion was valid. Alternatively, the window may be expanded. For example, if the competitor's promotional price for an item is offered on Thursday from 10 pm to 12 am, a transaction in which that item is purchased may receive a credit based on this promotional price if the transaction occurred within a larger window including the small window, e.g. Wednesday at 10 am through Friday at 1 pm.

In some embodiments, third party prices for certain types of items (e.g. items belonging to a particular category or department) may simply be excluded from consideration according to the methods described herein for purposes of assigning credits based on price differences if the third party prices are only valid on an atypical shopping day. In other embodiments, third party prices from certain competitors may be excluded from consideration according to the methods described herein for purposes of assigning credits based on price differences if the third party prices are only valid on an atypical shopping day. Third party prices for certain promotions or events may also be explicitly excluded from consideration according to the methods described herein for purposes of assigning credits based on price differences.

Figure 20:
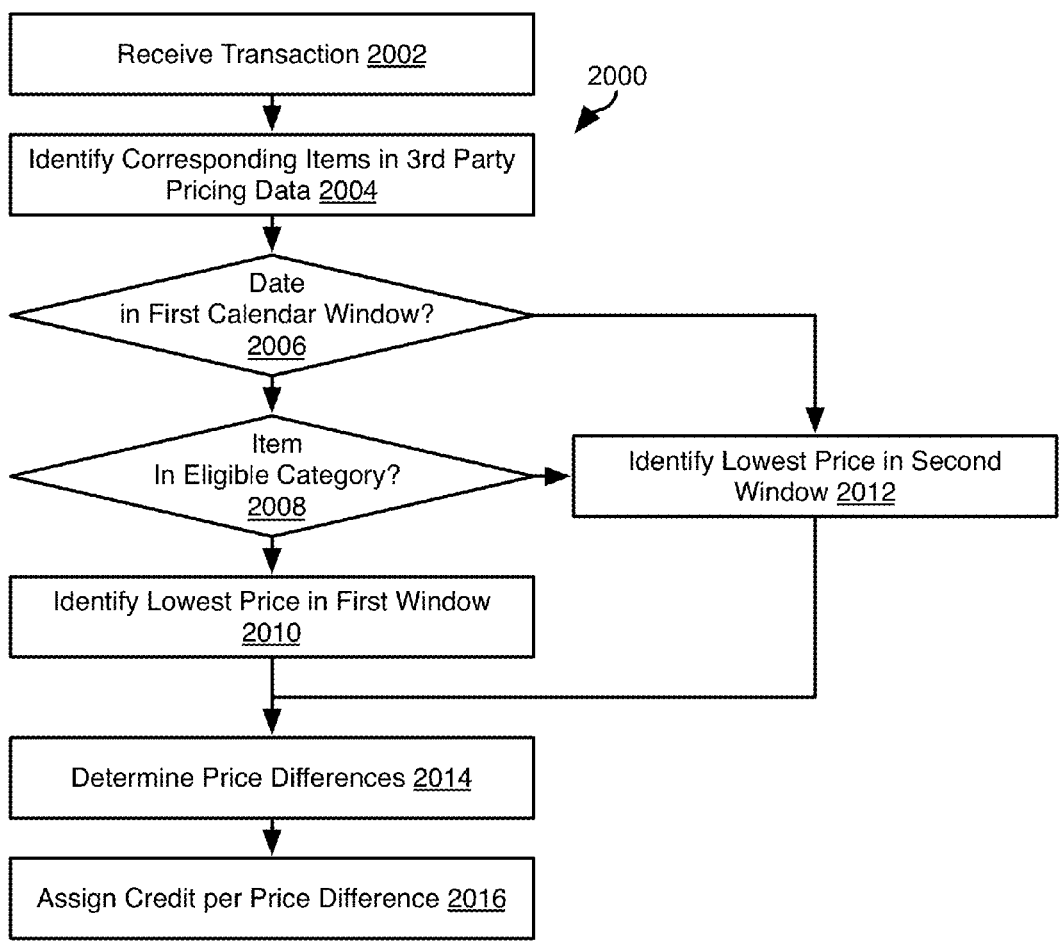
FIG. 20 is a process flow diagram of a method for determining a window for price comparison in accordance with an embodiment of the present invention.

Referring to FIG. 20, in some embodiments, seasonal purchasing patterns may be used to determine a window of time in which third party pricing data may be effective and still be used to compare to a price paid for a given item identifier. For example, during the holidays people may perform Christmas shopping from late November up until or perhaps after the Christmas holiday. Similar behavior may also occur for other seasonal goods.

Accordingly, the illustrated method 2000 may be used to account for seasonal shopping behavior. The method 2000 may include receiving 2002 a transaction (e.g. transaction record) and identifying 2004 third party pricing for item identifiers included in the transaction. In particular, only third party pricing data effective in stores in a defined geographic proximity to a store where the transaction occurred may be used, with the geographic limitation imposed in the same manner as for other methods described herein.

For each item identifier in the transaction, If the transaction date for the transaction identifier is found 2006 to be within a first calendar window and the each item identifier is found 2008 to be in an eligible category, then a lowest third party price may be identified among third party prices effective during a first window, which may be the same or different from the first calendar window. An eligible category may include a category of items that are likely to be purchased during the first calendar window. For example, during the holiday season, categories of items more likely to be purchased as gifts (electronics, toys, jewelry) may be eligible. In some embodiments, all purchases within the first calendar window are evaluated with respect to pricing data in the first window without regard to eligibility.

If the transaction date is not found 2006 to be within the first calendar window or the item is not found 2008 to be eligible, the lowest third party price effective during a second window including the transaction date may be used, the second window being smaller than the first window. For example, during a holiday season, the first window may be a period from the Thanksgiving holiday to the Christmas holiday. The second window may simply be a week or two-week period ending on the transaction date, centered on the transaction date, or otherwise including the transaction date.

The pricing data within the appropriate window (first or second) as determined according to steps 2006-2010 may then be used to determine 2014 a price difference between a price paid for an item identifier and a lowest third party price effective during the appropriate window and assign 2016 a credit to the customer according to this price difference, such as in the same manner as for other methods described herein.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method of operating a computer system, comprising:
receiving, by a server system, a record of a first transaction concluded on a sale terminal associated with a first merchant, the record including a unique transaction identifier, a unique user identifier, one or more item identifiers, and a price paid for each item identifier of the one or more item identifiers, wherein the price paid for each item identifier comprises a first discounted price;
for each item identifier of at least a portion of the one or more item identifiers and subsequent to the first transaction, establishing, by the server system, when the item identifier is eligible for an expanded pricing window based on a first transaction date of the first transaction and based on a category associated with the item identifier, wherein the first transaction date occurs within a first time window, a third party price associated with the item identifier comprises a second time window, and the second time window begins after the first transaction date and after the first time window begins, wherein the third party price comprises a second discounted price;

for each item identifier of the at least the portion of the one or more item identifiers that is eligible for the expanded pricing window, associating the item identifier with the second time window;

for each item identifier of the at least the portion of the one or more item identifiers that is ineligible for the expanded pricing window, associating the item identifier with the first time window;

identifying a geographical area based on a location of the sale terminal of the first merchant;

for each item identifier of the at least the portion of the one or more item identifiers and subsequent to the first transaction, identifying, by the server system, a third party record, the third party record corresponding to the item identifier and having a third party price, the third party price being associated with a second merchant located within the geographical area and being within the second time window;

for each item identifier of the at least the portion of the one or more item identifiers and subsequent to the first transaction, identifying, by the server system, one or more discounted identifiers of the at least the portion of the one or more item identifiers, the third party price of the third party record corresponding to the one or more discounted identifiers being less than the prices paid for the at least the portion of the one or more discounted identifiers by one or more price differences during the second time window, wherein the first transaction purchased within the expanded pricing window receives a credit based on the third party price;

crediting, by the server system, a user account associated with the unique user identifier with an amount corresponding to the credit based on the one or more price differences, the amount corresponding to the one or more price differences being stored as an electronic credit; and applying the electronic credit to a second transaction associated with the unique user identifier, the second transaction occurring after the first transaction.

2. The method of claim 1, wherein the amount credited to the user account is a multiple of a sum of the one or more price differences, the multiple being greater than one.

3. The method of claim 1, wherein identifying the third party record, the third party record corresponding to the item identifier and having the third party price further comprises for each item identifier of the at least the portion of the one or more item identifiers and subsequent to the first transaction:

determining a collective discount price for N instances of an additional item corresponding to the third party record during the second time window; and calculating the third party price for the additional item by prorating the collective discount price to an individual instance of the additional item corresponding to the third party record during the second time window.

4. The method of claim 1, wherein receiving, by the server system, the record of the first transaction concluded on the sale terminal comprises:

evaluating electronic receipts associated with the user account.

5. The method of claim 1, further comprising, for each item identifier of the at least the portion of the one or more item identifiers:

calculating at least one of a minimum price, a maximum price, or a variance of prices for an additional item corresponding to the item identifier within the second time window; and determining the third party price based on the at least one of the minimum price, the maximum price, or the variance of prices for the additional item within the second time window.

6. The method of claim 1, wherein:

receiving the record of the first transaction includes receiving a request from a user device associated with the user account to evaluate the first transaction; and the method further comprises:

determining that the request is a first request associated with the user account; and in response to determining that the request is the first request from the user account associated with the user device, assigning an award to the user account independent of the one or more price differences.

7. The method of claim 1, wherein:

receiving the record of the first transaction includes receiving a request from a user device associated with the user account to evaluate the first transaction; and the method further comprises:

determining that the request is an Nth request associated with the user account, N being an integer greater than 1; and in response to determining that the request is the Nth request from the user account associated with the user device, assigning an award to the user account independent of the one or more price differences.

8. A system comprising one or more processors and one or more memory devices operably coupled to the one or more processors, the one or more memory devices storing executable and operational data effective to cause the one or more processors to:

receive a record of a first transaction concluded on a sale terminal associated with a first merchant, the record including a unique transaction identifier, a unique user identifier, one or more item identifiers, and a price paid for each item identifier of the one or more item identifiers, wherein the price paid for each item identifier comprises a first discounted price;

for each item identifier of at least a portion of the one or more item identifiers and subsequent to the first transaction, establish when the item identifier is eligible for an expanded pricing window based on a transaction date of the first transaction and based on a category associated with the item identifier, wherein a first transaction date occurs within a first time window, a third party price associated with the item identifier comprises a second time window, and the second time window begins after the first transaction date and after the first time window begins, wherein the third party price comprises a second discounted price;

for each item identifier of the at least the portion of the one or more item identifiers that is eligible for the expanded pricing window, associate the item identifier with the second time window;

for each item identifier of the at least the portion of the one or more item identifiers that is ineligible for the expanded pricing window, associate the item identifier with the first time window;

identify a geographical area based on a location of the sale terminal of the first merchant;

for each item identifier of the at least the portion of the one or more item identifiers and subsequent to the first transaction, identify a third party record, the third party record corresponding to the item identifier and having a third party price, the third party price being associated with a second merchant located within the geographical area and being within the second time window;

for each item identifier of the at least the portion of the one or more item identifiers and subsequent to the first transaction, identify one or more discounted identifiers of the at least the portion of the one or more item identifiers, the third party price of the third party record corresponding to the one or more discounted identifiers being less than the prices paid for the at least the portion of the one or more discounted identifiers by one or more price differences during the second time window, wherein the first transaction purchased within the expanded pricing window receives a credit based on the third party price;

credit a user account associated with the unique user identifier with an amount corresponding to the credit of the one or more price differences, the amount corresponding to the one or more price differences being stored as an electronic credit; and apply the electronic credit to a second transaction associated with the unique user identifier, the second transaction occurring after the first transaction.

9. The system of claim 8, wherein the amount credited to the user account is a multiple of a sum of the one or more price differences, the multiple being greater than one.

10. The system of claim 8, wherein the executable and operational data are further effective to cause the one or more processors to, for each item identifier of the at least the portion of the one or more item identifiers:

calculating at least one of a minimum price, a maximum price, and a variance of prices for an additional item corresponding to the item identifier within the second time window; and determining the third party price based on the at least one of the minimum price, the maximum price, and the variance of prices for the additional item within the second time window.

11. The system of claim 8, wherein the executable and operational data are further affected to cause the one or more processors to:

receive a request from a user device associated with the user account to evaluate the first transaction;

determine that the request is a first request associated with the user account; and in response to determining that the request is the first request from the user account associated with the user device, assign an award to the user account independent of the one or more price differences.

12. The system of claim 8, wherein the executable and operational data are further affected to cause the one or more processors to:

receive a request from a user device associated with the user account to evaluate the first transaction;

determine that the request is an Nth request associated with the user account, N being an integer greater than 1; and in response to determining that the request is the Nth request from the user account associated with the user device, assign an award to the user account independent of the one or more price differences.

13. A system, comprising:

a sale terminal; and one or more processors and one or more memory devices operably coupled to the one or more processors, the one or more memory devices storing executable and operational data effective to cause the one or more processors to:

receive a record of a first transaction concluded on a sale terminal associated with a first merchant, the record including a unique transaction identifier, a unique user identifier, one or more item identifiers, and a price paid for each item identifier of the one or more item identifiers, wherein the price paid for each item identifier comprises a first discounted price;

for each item identifier of at least a portion of the one or more item identifiers and subsequent to the first transaction, establish when the item identifier is eligible for an expanded pricing window based on a transaction date of the first transaction and based on a category associated with the item identifier, wherein a first transaction date occurs within a first time window, a third party price associated with the item identifier comprises a second time window, and the second time window begins after the first transaction date and after the first time window begins, wherein the third party price comprises a second discounted price;

for each item identifier of the at least the portion of the one or more item identifiers that is eligible for the expanded pricing window, associate the item identifier with the second time window;

for each item identifier of the at least the portion of the one or more item identifiers that is ineligible for the expanded pricing window, associate the item identifier with the first time window;

identify a geographical area based on a location of the sale terminal of the first merchant;

for each item identifier of the at least the portion of the one or more item identifiers and subsequent to the first transaction, identify a third party record, the third party record corresponding to the item identifier and having a third party price, the third party price being associated with a second merchant located within the geographical area and being within the second time window;

for each item identifier of the at least the portion of the one or more item identifiers and subsequent to the first transaction, identify one or more discounted identifiers of the at least the portion of the one or more item identifiers, the third party price of the third party record corresponding to the one or more discounted identifiers being less than the prices paid for the at least the portion of the one or more discounted identifiers by one or more price differences during the second time window, wherein the first transaction purchased within the expanded pricing window receives a credit based on the third party price;

credit a user account associated with the unique user identifier with an amount corresponding to the credit based on the one or more price differences, the amount corresponding to the one or more price differences being stored as an electronic credit; and apply the electronic credit to a second transaction associated with the unique user identifier, the second transaction occurring after the first transaction.

* * * * *